US011842314B1

(12) United States Patent
Nanton

(10) Patent No.: US 11,842,314 B1
(45) Date of Patent: Dec. 12, 2023

(54) APPARATUS FOR A SMART ACTIVITY ASSIGNMENT FOR A USER AND A CREATOR AND METHOD OF USE

(71) Applicant: Celebrity Branding Agency, Lake Mary, FL (US)

(72) Inventor: Nick Nanton, Lake Mary, FL (US)

(73) Assignee: Celebrity Branding Agency, Lake Mary, FL (US)

( * ) Notice: Subject to any disclaimer, the term of this patent is extended or adjusted under 35 U.S.C. 154(b) by 0 days.

(21) Appl. No.: 18/117,817

(22) Filed: Mar. 6, 2023

(51) Int. Cl.
*G06Q 10/00* (2023.01)
*G06Q 10/0639* (2023.01)
*G06Q 10/0631* (2023.01)

(52) U.S. Cl.
CPC ........... *G06Q 10/06398* (2013.01); *G06Q 10/063118* (2013.01)

(58) Field of Classification Search
CPC ............ G06Q 10/063; G06Q 10/0639; G06Q 10/06398; G06Q 10/0631; G06Q 10/06311; G06Q 10/063118; G06Q 10/063112
See application file for complete search history.

(56) References Cited

U.S. PATENT DOCUMENTS

| 2014/0082072 | A1* | 3/2014 | Kass | G06F 16/9535 |
| | | | | 709/204 |
| 2019/0213509 | A1* | 7/2019 | Burleson | G06N 20/00 |
| 2021/0150338 | A1* | 5/2021 | Semenov | G06F 18/24765 |
| 2021/0150453 | A1* | 5/2021 | Ozcaglar | G06Q 10/063112 |
| 2021/0365867 | A1* | 11/2021 | Kim | G06Q 10/06 |
| 2022/0075804 | A1* | 3/2022 | Kim | G06F 16/285 |

OTHER PUBLICATIONS

Kodjiku, S. L. et al. (2022). ExCrowd: A blockchain framework for exploration-based crowdsourcing. Applied Sciences, 12(13), 6732. (Year: 2022).*

* cited by examiner

*Primary Examiner* — William S Brockington, III
(74) *Attorney, Agent, or Firm* — CALDWELL INTELLECTUAL PROPERTY LAW

(57) ABSTRACT

Apparatus and method for a smart activity assignment for a user and a creator is disclosed. The apparatus includes a memory that includes instructions configuring at least a processor to receive user data, wherein the user data includes user reputation data and initial activity data, classify the user data into one or more user data groups, wherein the one or more user data groups includes a user reputation group and an initial activity group, determine a user reputation score as a function of the user reputation group and an initial activity score as a function of the initial activity group, analyze a compatibility of a user and an initial activity of a creator by comparing the user reputation score and the initial activity score, generate an initial activity action as a function of the compatibility and generate an exposure action item as a function of the initial activity action.

20 Claims, 8 Drawing Sheets

APPARATUS FOR A SMART ACTIVITY ASSIGNMENT FOR A USER AND A CREATOR AND METHOD OF USE

FIELD OF THE INVENTION

The present invention generally relates to determining action items. In particular, the present invention is directed apparatus for a smart activity assignment for a user and a creator and method of use.

BACKGROUND

The problem of assigning projects is a common challenge faced by many individuals and organizations. Inefficient project assignments can lead to a range of issues, including underutilization of resources, low project quality and waste of time and energy of the individuals and the organization. Additionally, in some cases, the reputation of a user may not be a match for a project. Existing solutions to address these needs are not sufficient.

SUMMARY OF THE DISCLOSURE

In an aspect, an apparatus for a smart activity assignment for a user and a creator is disclosed. The apparatus includes at least a processor and a memory communicatively connected to the at least a processor, wherein the memory includes instructions configuring the at least a processor to receive user data, wherein the user data includes user reputation data and initial activity data, classify the user data into one or more user data groups, wherein the one or more user data groups includes a user reputation group and an initial activity group, determine a user reputation score as a function of the user reputation group of the one or more user data groups, determine an initial activity score as a function of the initial activity group of the one or more user data groups, analyze a compatibility of a user and an initial activity of a creator by comparing the user reputation score and the initial activity score, generate an initial activity action as a function of the compatibility of the user and the initial activity of the creator and generate an exposure action item as a function of the initial activity action.

In another aspect, a method for distributing activities to a user and a creator is disclosed. The method includes receiving, using at least a processor, user data, wherein the user data includes user reputation data and initial activity data, classifying, using the at least a processor, the user data into one or more user data groups, wherein the one or more user data groups includes a user reputation group and an initial activity group, determining, using the at least a processor, a user reputation score as a function of the user reputation group of the one or more user data groups, determining, using the at least a processor, an initial activity score as a function of the initial activity group of the one or more user data groups, analyzing, using the at least a processor, a compatibility of a user and an initial activity of a creator by comparing the user reputation score and the initial activity score, generating, using the at least a processor, an initial activity action as a function of the compatibility of the user and the initial activity of the creator and generating, using the at least a processor, an exposure action item as a function of the initial activity action.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
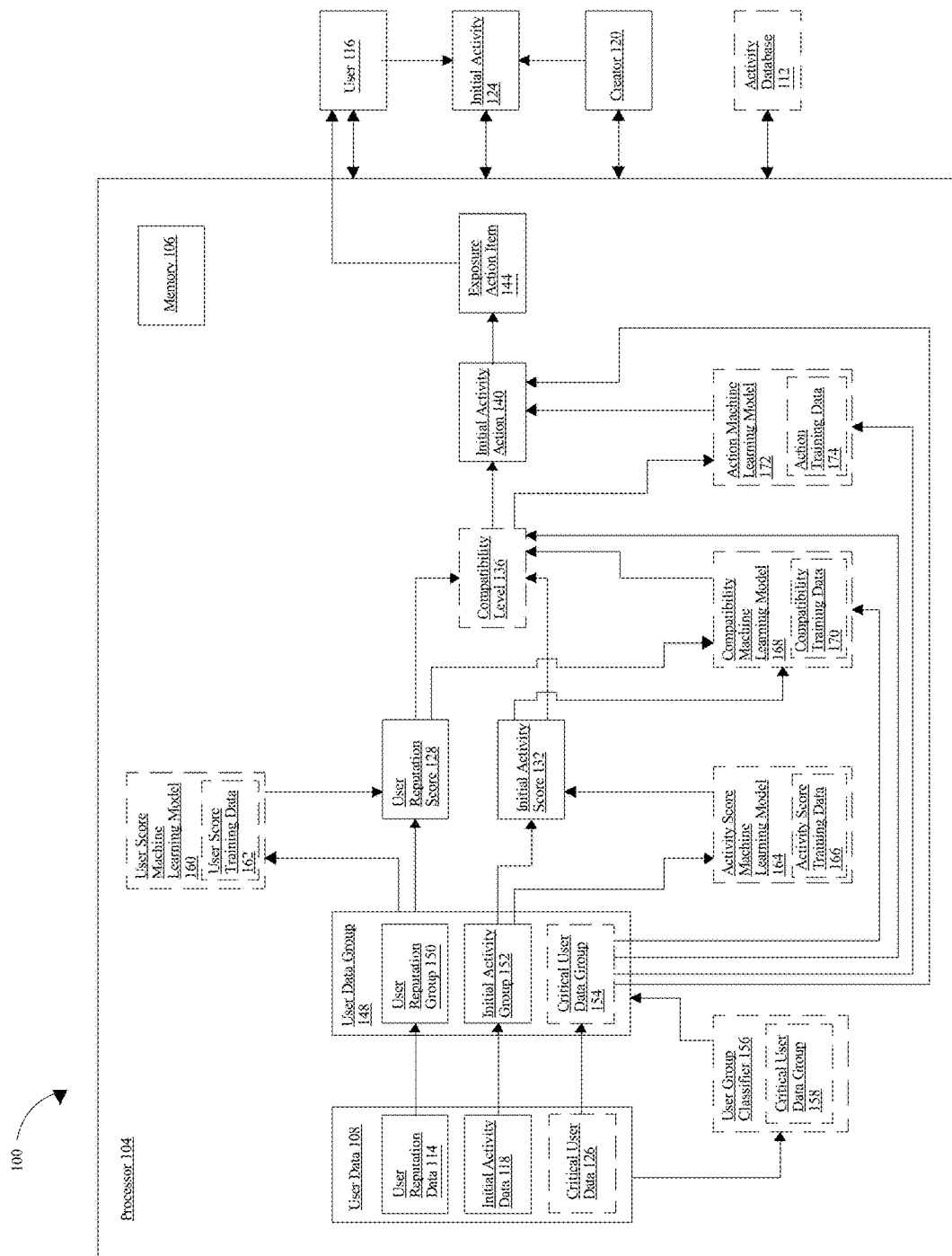
FIG. 1 is a block diagram of exemplary embodiment of an apparatus for a smart activity assignment for a user and a creator.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for a smart activity assignment for a user and a creator is disclosed. The apparatus includes at least a processor and a memory communicatively connected to the at least a processor, wherein the memory includes instructions configuring the at least a processor to receive user data, wherein the user data includes user reputation data and initial activity data, classify the user data into one or more user data groups, wherein the one or more user data groups includes a user reputation group and an initial activity group, determine a user reputation score as a function of the user reputation group of the one or more user data groups, determine an initial activity score as a function of the initial activity group of the one or more user data groups, analyze a compatibility of a user and an initial activity of a creator by comparing the user reputation score and the initial activity score, generate an initial activity action as a function of the compatibility of the user and the initial activity of the creator and generate an exposure action item as a function of the initial activity action.

Aspects of the present disclosure can be used to examine a user's reputation. Aspects of the present disclosure can also be used to examine a value of a creator's activity. Exemplary embodiments illustrating aspects of the present disclosure are described below in the context of several specific examples.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way.

Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from a lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce a lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running a lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multiparty computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate may include a file that conveys information and links the conveyed information to a "certificate authority" that is the issuer of a public key in a public key cryptographic system. Certificate authority in some embodiments may include data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) may be available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for a smart activity assignment for a user and a creator is illustrated. The apparatus 100 includes at least a processor 104. The at least a processor 104 may include, without limitation, any processor described in this disclosure. The at least a processor 104 may be included in a computing device. The at least a processor 104 may include any computing device as described in this disclosure, including without limitation a microcontroller, microprocessor, digital signal processor (DSP) and/or system on a chip (SoC) as described in this disclosure. The at least a processor 104 may include, be included in, and/or communicate with a mobile device such as a mobile telephone or smartphone. The at least a processor 104 may include a single computing device operating independently, or may include two or more computing device operating in concert, in parallel, sequentially or the like; two or more computing devices may be included together in a single computing device or in two or more computing devices. The at least a processor 104 may interface or communicate with one or more additional devices as described below in further detail via a network interface device. Network interface device may be utilized for connecting the at least a processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The at least a processor 104 may include but is not limited to, for example, a computing device or cluster of computing devices in a first location and a second computing device or cluster of computing devices in a second location. The at least a processor 104 may include one or more computing devices dedicated to data storage, security, distribution of traffic for load balancing, and the like. The at least a processor 104 may distribute one or more computing tasks as described below across a plurality of computing devices of computing device, which may operate in parallel, in series, redundantly, or in any other manner used for distribution of tasks or memory between computing devices. The at least a processor 104 may be implemented, as a non-limiting example, using a "shared nothing" architecture.

With continued reference to FIG. 1, at least a processor 104 may be designed and/or configured to perform any method, method step, or sequence of method steps in any embodiment described in this disclosure, in any order and with any degree of repetition. For instance, the at least a processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The at least a processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 106 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, a memory 106 includes instructions configuring the at least a processor 104 to receive user data 108. For purposes of this disclosure, "user data" is data that is related to a user. For the purposes of this disclosure, a "user" is any individual, group, company and/or entity that uses an apparatus. In some embodiments, the user data 108 may be stored in an activity database 112. In some embodiment, the user data 108 may be retrieved from the activity database 112.

With continued reference to FIG. 1, in an embodiment, user data 108 may include user reputation data 114. For the purposes of this disclosure, "user reputation data" is any data that affects a user's reputation. For the purposes of this disclosure, a "user reputation" is opinions, beliefs, and perceptions that a third party holds about a user. For the purposes of this disclosure, a "third party" is any individual, group, company and/or entity that is not a user. As a non-limiting example, the user reputation data may include any actions, behavior, communication, and/or the like thereof that is conducted by a user 116. As another non-limiting example, the user reputation data may include any formats such as but not limited to text, audio, image, video, and any formats of data thereof. For example and without limitation, the user reputation data may include a post on a social media created by the user 116, a post on the social media about the user 116, news about the user 116, a video of a speech in a conference, a photo of the user 116, comments about the user 116, comments created by the user 116, an article the user 116 published, a lecture the user 116 conducted, an interview the user 116 had, a review about a book the user 116 wrote, a review about a movie the user 116 acted, and the like. Persons skilled in the art, upon reviewing the entirety of this disclosure, may appreciate a various user reputation data 114 that may be used for an apparatus 100. For the purposes of this disclosure, a "social media" is a content sharing platform. As a non-limiting example, social media may include Google, Instagram, Facebook, LinkedIn, TikTok, and any social media thereof.

With continued reference to FIG. 1, on an embodiment, user reputation data 114 may include user information. For the purposes of this disclosure, "user information" is data related to a personal information of a user. As a non-limiting example, the user information may include a gender, profession, age, geographical information, family information, financial information, health information, and the like of a user 116.

With continued reference to FIG. 1, in some embodiments, a memory 106 may include instructions configuring at least a processor 104 to analyze user reputation data 114 to find positive user reputation and/or negative user reputation. In an embodiment, the user reputation data 114 may include the positive user reputation. For the purposes of this disclosure, a "positive user reputation" is any data that positively affects a user's reputation. As a non-limiting example, the positive user reputation may include a 5 star review in a review related to a user 116, a word 'excellent' in a comment related to the user 116, a name of the user 116 in a video nominating a prestigious award, and any positive user reputation thereof. As another non-limiting example, the positive user reputation may include trustworthy, reliable, beneficial, favorable, loyal, respectful, collaborative, and the like. Persons skilled in the art, upon reviewing the entirety of this disclosure, may appreciate various positive user reputation that may be used in an apparatus 100. In another embodiment, the user reputation data 114 may include negative user reputation. For the purposes of this disclosure, "negative user reputation" is any data that negatively affects a user's reputation. As a non-limiting example, the negative user reputation may include a 0 star review in a review related to the user 116, a word 'poor' in a comment related to the user 116, a name of the user 116 in a video nominating an award to a person with the worst hairstyle, a post created by the user 116 with swear words, and any negative user reputation thereof. As another non-limiting example, the negative user reputation may include untrustworthy, unreliable, harmful, damaging, unfavorable, disloyal, disrespectful, noninteractive, and the like. Persons skilled in the art, upon reviewing the entirety of this disclosure, may appreciate various negative user reputation that may be used in an apparatus 100.

With continued reference to FIG. 1, in some embodiments, at least a processor 104 may analyze user reputation data 114 to identify positive user reputation and negative user reputation using audiovisual speech recognition (AVSR.) For example, the at least a processor 104 may use the user reputation data 114 to aid in recognition of audible content such as the positive user reputation and the negative user reputation. AVSR may use the user reputation data 114 to aid the overall translation of the audio content of user reputation data 114. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an auditory user reputation data 114 such as but not limited to radio news, voice records, videos, and the like, and a visual user reputation data 114 such as but not limited to videos, news, and the like to recognize the audio content. For instance, audio vector and image vector may each be concatenated and used to predict speech made by a person, who is 'on camera.'

With continued reference to FIG. 1, in some embodiments, at least a processor 104 may analyze user reputation data 114 to find positive user reputation and negative user reputation using optical character recognition (OCR.) In some cases, the at least a processor 104 may be configured to recognize a keyword using the OCR to find the positive user reputation and the negative user reputation. As used in this disclosure, a "keyword" is an element of word or syntax used to identify and/or match elements to each other. In some cases, the at least a processor 104 may transcribe much or even substantially all user reputation data 114.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from user reputation data 114 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of user reputation data 114. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the user reputation data 114 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes user reputation data 114. Since the adaptive classifier may have learned something useful a little too late to recognize characters on the first pass, a second pass may be run over the user reputation data 114. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, a user 116 may manually input user reputation data into an apparatus 100 as positive user reputation and/or negative user reputation. In an embodiment, the positive user reputation and/or the negative user reputation may be stored in an activity database 112. In another embodiment, the positive user reputation and/or the negative user reputation may be retrieved from the user 116, the activity database 112, external computing devices, and/or previous iterations of processing. The activity database 112 disclosed herein is further described below.

With continued reference to FIG. 1, in another embodiment, the user data 108 may include initial activity data 118. For the purposes of this disclosure, "initial activity data" is data related to a project of a creator. The initial activity data 118 may include a project of a creator 120 that is not completed yet and that a user 116 is interested in. For the purposes of this disclosure, a "creator" is an individual, group, company and/or entity that creates a project. For the purposes of this disclosure, an "initial activity" is any work that is created by a creator. The initial activity of the creator 120 may need a funding from a user 116. The funding disclosed herein is further described below. Alternatively, the initial activity may be disclosed as "project" throughout the entirety of this disclosure. As a non-limiting example, the project may include business project, art project, construction project, research project, social project, and the like. As another non-limiting example, the project may include documentaries, films, books, screenwriting, theater plays, and the like. As another non-limiting example, the initial activity 124 may be a not-for-profit initial activity. In some embodiments, the initial activity 124 may generate revenue. Persons skilled in the art, upon reviewing the entirety of this disclosure, may appreciate various projects that may be used in an apparatus 100.

With continued reference to FIG. 1, in an embodiment, initial activity data 118 may include initial activity information. For the purposes of this disclosure, "initial activity information" is information related to a project of a creator. As a non-limiting example, the initial activity information may include a name of the project, people related to the project, creation date of the project, financial information of the project such as but not limited to budget, fund status and the like, timeline of the project, requirements to create the project, project size, and any information related to the project thereof. Persons skilled in the art, upon reviewing the entirety of this disclosure, may appreciate various initial activity information that may be used in an apparatus 100.

With continued reference to FIG. 1, in another embodiment, initial activity data 118 may include an initial proposal. For the purposes of this disclosure, an "initial proposal" is a numerical value a user is willing to fund for a project. As a non-limiting example, the initial proposal may include any amount of the initial proposal, such as but not limited to $1, $12, $300, $45000, and the like. For the purposes of this disclosure, "funding" is a process of providing money for a particular purposes. As a non-limiting example, a user 116 may be willing to fund the project in return for money. As another non-limiting example, the user 116 may be willing to fund the project in return for user reputation. For example and without limitation, funding the project may positively affect a user reputation of the user 116. As another non-limiting example, the user 116 may be willing to fund the project in return for nothing. For example and without limitation, the user 116 may donate money to the project.

With continued reference to FIG. 1, in an embodiment, an initial proposal of initial activity data may include a non-fungible token (NFT.) For the purposes of this disclosure, a "non-fungible token," also called "NFT" is a cryptographic asset on an immutable sequential listing with unique identification codes and metadata that distinguishes it from other NFTs. In another embodiment, the initial proposal may include cryptocurrency. "Cryptocurrency," as used in this disclosure, is a digital or virtual currency that is secured by cryptography, which makes it nearly impossible to counterfeit or double-spend. In some embodiments, cryptocurrencies may include decentralized networks based on blockchain technology such as immutable sequential listing enforced by a network of computing devices including apparatus 100. As a non-limiting example, the initial proposal may allow various types of cryptocurrency such as Ethereum (ETH), Litecoin (LTC), Cardano (ADA), Polkadot (DOT), Bitcoin Cash (BCH), Stellar (XLM), and the like thereof. In some embodiments, the initial proposal may include fiat money such as paper money. Persons skilled in the art, upon reviewing the entirety of this disclosure, will be aware of the various embodiments of different types of money for purposes as described herein.

With continued reference to FIG. 1, in some embodiments, initial activity data 118 of user data 108 may include critical user data 126. For the purposes of this disclosure, "critical user data" is data that is related to a critical user. For the purposes of this disclosure, a "critical user" is a user that a creator wants funding from. As a non-limiting example, the critical user may include any person, company and/or entity that includes positive reputation that can benefit an initial activity. In some embodiments, the critical user data 126 may include a name of the critical user. In some embodiments, each of the critical user data 126 may include a user reputation score 128 and/or an initial activity score 132. In some embodiments, the creator 120 may manually input the critical user data 126. In some embodiments, the critical user data 126 may be stored and/or retrieved in and/or from an activity database 112. Persons skilled in the art, upon reviewing the entirety of this disclosure, may appreciate various critical users that may be used for the critical user data 126.

With continued reference to FIG. 1, at least a processor 104 may receive user data 108 from a user 116. As a non-limiting example, the user 116 may manually input the user data 108 such as but not limited to an apparatus 100. In some embodiments, at least a processor 104 may receive user data 108 from a creator 120. As a non-limiting example, the creator 120 may manually input the initial activity data 118 into an apparatus 100. In some embodiments, the user data 108 may be received from an activity database 112. In some embodiments, the user data 108 may be stored in the activity database 112. For the purposes of this disclosure, a "project database" is a data structure configured to store data related to user data. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in one or more embodiments, an activity database 112 may include input or calculated information and datum related to user data 108. The activity database 112 may include real-time and/or previous input user data 108 and any calculated information related to them. As a non-limiting example, the activity database 112 may include one or more user data groups 148, a user reputation score 128, an initial activity score 132, a compatibility level 136, an initial activity action 140, an exposure action item 144, and the like. At least a processor 104 may be communicatively connected with the activity database 112. For example, and without limitation, in some cases, the activity database 112. may be local to at least a processor 104. In another example, and without limitation, the activity database 112 may be remote to at least a processor 104 and communicative with the at least a processor 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure at least a processor connects directly, dynamically, and non-hierarchically to as many other computing devices as possible. A "network topology" as used in this disclosure is an arrangement of elements of a communication network. Network may use an immutable sequential listing to securely store an activity database 112. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, at least a processor 104 may receive user data 108 from a blockchain storage. In some embodiments, blockchain storage may be a decentralized data storage. In a non-limiting example, blockchain storage may be configured to save data such as, without limitation, user data 108 in a decentralized network, wherein the decentralized network may distribute user data 108 and/or data collection processing across multiple devices. Data collection processing may include any processing step described in this disclosure. In some embodiments, blockchain storage may be configured to process user data 108 through a sharding process, wherein the sharding process is a data store partitioning that separates into a plurality of smaller data stores known as data store shards. As used in this disclosure, a "data store shard" is a horizontal/vertical partition of data such as, without limitation, user data in a data storage that is held on a separate instance of the data storage. Each shard may be copied to prevent data loss. Additionally, or alternatively, user data 108 may be encrypted with private key. Private key may be any encryption key described above in this disclosure. Encryption of user data 108 may include any processing steps described anywhere in this disclosure.

With continued reference to FIG. 1, additionally, or alternatively, any processing step regarding user data 108 may be performed within a decentralized platform. A "decentralized platform," as used in this disclosure, is a platform or server that enables secure data exchange between anonymous parties. Decentralized platform may be supported by any blockchain technologies. For example and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform can make it difficult if not impossible to discern a particular center. In some embodiments, decentralized platform can include a decentralized ecosystem. Decentralized platform may serve as an ecosystem for decentralized architectures such as an immutable sequential listing and/or blockchain.

With continued reference to FIG. 1, in a non-limiting embodiment, decentralized platform may implement decentralized finance (DeFi). "Decentralized finance," as used in this disclosure, as financial technology based on secure distributed ledgers. A decentralized finance architecture may include cryptocurrencies, software, and hardware that enables the development of applications. Defi offers financial instruments without relying on intermediaries such as brokerages, exchanges, or banks. Instead, it uses smart contracts on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow users 116 and/or owners to lend or borrow funds from others, trade cryptocurrencies and/or NFTs, insure against risks, and receive payments. In a non-limiting embodiment, Defi may eliminate intermediaries by allowing users 116 to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein.

With continued reference to FIG. 1, in some embodiments, decentralized platform may implement Web 3.0. Whereas Web 2.0 is a two-sided client-server architecture, with a business hosting an application and users (customers and advertisers), "Web 3.0," as used in this disclosure, is an idea or concept that decentralizes the architecture on open platforms. In some embodiments, decentralized platform may enable communication between a plurality of computing devices, wherein it is built on a back-end of peer-to-peer, decentralized network of nodes (computing devices), the applications run on decentralized storage systems rather than centralized servers. In some embodiments, these nodes of computing devices may be comprised together to form a World Computer. A "World Computer," as used in this disclosure, is a group of computing devices that are capable of automatically executing smart contract programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus 100 may be communicatively connected to immutable sequential listing. Any digitally signed assertions onto immutable sequential listing may be configured to be confirmed by the World Computer. Alternatively or additionally, apparatus 100 may be configured to store a copy of immutable sequential listing into memory 106. This is so, at least in part, to process a digitally signed assertion that has a better chance of being confirmed by the World Computer prior to actual confirmation. In a non-limiting embodiment, decentralized platform may be configured to tolerate localized shutdowns or attacks; it is censorship-resistant. In another non-limiting embodiment decentralized platform and/or apparatus 100 may incorporate trusted computing. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of a decentralized platform for purposes as described herein.

With continued reference to FIG. 1, decentralized platform may include a decentralized exchange platform. A "decentralized exchange platform," as is used in this disclosure, contains digital technology, which allows buyers and sellers of securities such as NFTs to deal directly with each other instead of meeting in a traditional exchange. In some embodiments, decentralized platform may include an NFT marketplace. An "NFT marketplace" is a marketplace allowing users to trade NFTs and upload them to an address. Decentralized platform may act as any NFT marketplace such as, but not limited to, OpenSea, Polygon, FCTONE, The Sandbox, Crypt® Kitties, Dentraland, Nifty Gateway, VEEFreinds, ROCKI, SuperRare, Enjin Marketplace, Rarible, WazirX, Portion, Zora, Mintable, PlayDapp, Aavegotchi, and the like thereof. Persons skilled in the art, upon reviewing the entirety of this disclosure, will be aware of the various embodiments of a marketplace in the context of NFTs.

With continued reference to FIG. 1, apparatus 100 may include a digital port enabling a user 116 to connect a digital wallet to an NFT-supported system such as decentralized platform, at least a processor 104, and/or immutable sequential listing. A "digital wallet," as used in this disclosure, is a software-based system that securely stores users' and/or third party's payment information and passwords for numerous payment methods and websites. By using a digital wallet, users 116 and/or creators 120 can complete purchases easily and quickly with near-field communications technology. In a non-limiting embodiment, decentralized platform may include a web interface enabling a user 116 to create an NFT associated with the creative work and upload a digital file representing ownership of creative work to decentralized platform.

With continued reference to FIG. 1, in some embodiments, at least a processor 104 may receive user data 108 from an application residing on a remote device. For the purposes of this disclosure, a "remote device" is any device a user and/or a creator uses to input user data. As a non-limiting example, the remote device may include a laptop, tablet, mobile phone, smart watch, headsets, or things of the like. In some embodiments, a user 116 and/or a creator 120 may use a user interface in the remote device to input the user data 108. For the purposes of this disclosure, a "user interface" is a means by which a user and/or a creator and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, the user 116 and/or the creator 120 may interact with user interface in virtual reality. In some embodiments, the user 116 and/or the creator 120 may interact with the use interface using a computing device distinct from and communicatively connected to at least a processor 104. In an embodiment, user interface may include a graphical user interface. A "graphical user interface," as used herein, is a graphical form of user interface that allows users and creators to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this may include pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Using an icon may be a fast way to open documents, run programs etc. because clicking on them yields instant access. Information contained in user interface may be directly influenced using graphical control elements such as widgets. A "widget," as used herein, is a user control element that allows a user and a creator to control and change the appearance of elements in the user interface. In this context a widget may refer to a generic GUI element such as a check box, button, or scroll bar to an instance of that element, or to a customized collection of such elements used for a specific function or application such as without limitation a dialog box for the users 116 and/or the creators 120 to customize their computer screen appearances. User interface controls may include software components that a user interacts with through direct manipulation to read or edit information displayed through user interface. Widgets may be used to display lists of similar items, navigate the system using links, tabs, and manipulate data using check boxes, radio boxes, and the like.

With continued reference to FIG. 1, in some embodiments, user data 108 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, at least a processor 104 may generate a web crawler to scrape user data 108 from social media sites, blogs, news websites, forums, investment related websites, finance related websites, search engines, media streaming sites, and the like. The web crawler may be seeded and/or trained with a reputable website to begin the search. A web crawler may be generated by the at least a processor 104. In some embodiments, the web crawler may be trained with information received from a user 116 and/or a creator 120 through a user interface. In some embodiments, the web crawler may be configured to generate a web query. A web query may include search criteria received from the user 116 and/or the creator 120. For example, the user 116 and/or the creator 120 may submit a plurality of websites for the web crawler to search user data statistics from and correlate to the user data 108. Additionally, the web crawler function may be configured to search for and/or detect one or more data patterns. A "data pattern" as used in this disclosure is any repeating forms of information. In some embodiments, the web crawler may be configured to determine the relevancy of a data pattern. Relevancy may be determined by a relevancy score. A relevancy score may be automatically generated by the at least a processor 104, received from a machine learning model, and/or received from the user 116 and/or the creator 120. In some embodiments, a relevancy score may include a range of numerical values that may correspond to a relevancy strength of data received from a web crawler function. As a non-limiting example, a web crawler function may search the Internet for user data 108. The web crawler may return user data 108, such as, as non-limiting examples, user reputation data, initial activity data, and the like.

With continue reference to FIG. 1, a memory 106 includes instructions configuring at least a processor 104 to classify user data 108 into one or more user data groups 148. For the purposes of this disclosure, a "user data group" is a set of associative user data. In an embodiment, the one or more user data groups 148 includes a user reputation group 150. For the purposes of this disclosure, a "user reputation group" is a set of associative user reputation data. As a non-limiting example, the user reputation group 150 may include a user information group. For the purposes of this disclosure, a "user information group" is a set of associative user information of user reputation data. For example and without limitation, the user information group may include a gender group, profession group, age group, geographical information group, family information group, financial information group, health information group, and any other groups thereof.

With continued reference to FIG. 1, as another non-limiting example, a user reputation group 150 may include a positive user reputation group. For the purposes of this disclosure, a "positive user reputation group" is a set of associative positive user reputation of user reputation data. For example and without limitation, the positive user reputation group may include video group, social media group, audio group, image group, text group, and any other positive user reputation group thereof. For another example and without limitation, the positive user reputation group may include a comment group, keyword group, review group, posting group, and any other positive user reputation group thereof. Persons skilled in the art, upon reviewing the entirety of this disclosure, may appreciate various positive user reputation group that may be used in an apparatus 100.

With continued reference to FIG. 1, as another non-limiting example, a user reputation group 150 may include a negative user reputation group. For the purposes of this disclosure, a "negative user reputation group" is a set of associative negative user reputation of user reputation data. For example and without limitation, the negative user reputation group may include video group, social media group, audio group, image group, text group, and any other negative user reputation group thereof. For another example and without limitation, the negative user reputation group may include a comment group, keyword group, review group, posting group, and any other negative user reputation group thereof. Persons skilled in the art, upon reviewing the entirety of this disclosure, may appreciate various positive user reputation group that may be used in an apparatus 100.

With continued reference to FIG. 1, in another embodiment, one or more user data groups 148 includes an initial activity group 152. For the purposes of this disclosure, a "initial activity group" is a set of associative initial activity data. As a non-limiting example, the initial activity group 152 may include an initial activity information group. For the purposes of this disclosure, a "initial activity information group" is a set of associative initial activity information initial activity data. For example and without limitation, the initial activity information group may include a name group, people group, date group, financial information group such as but not limited to budget group, fund status group, project size group, and the like, timeline group, requirements group, and any groups related to the initial activity information thereof. Persons skilled in the art, upon reviewing the entirety of this disclosure, may appreciate various initial activity information groups that may be used in an apparatus 100.

With continued reference to FIG. 1, as another non-limiting example, an initial activity group 152 may include an initial proposal group. For the purposes of this disclosure, a "initial proposal group" is a set of associative initial proposal of initial activity data. For example and without limitation the initial proposal group may include initial proposal amount group, and the like. For another example and without limitation the initial proposal group may include type of initial proposal group such as but not limited to NFT group, cryptocurrency group, fiat money group, and the like. Persons skilled in the art, upon reviewing the entirety of this disclosure, may appreciate various initial proposal groups that may be used in an apparatus 100.

With continued reference to FIG. 1, as another non-limiting example, an initial activity group 152 may include a critical user data group 154. For the purposes of this disclosure, a "critical user data group" is a set of associative critical user data. For example and without limitation the critical user data group 154 may include a name group, wherein the name group of the critical user data group 154 may include one or more names of critical users.

With continued reference to FIG. 1, in some embodiments, at least a processor 104 may classify user data 108 to one or more user data groups 148 using a user group classifier 156. As used in this disclosure, a "user group classifier" is a machine-learning model, such as a mathematical model, neural net, or program generated by a machine learning algorithm known as a "classification algorithm," that sorts user data related inputs into categories or bins of data, outputting one or more user data groups associated therewith. The user group classifier 156 disclosed herein may be consistent with a classifier disclosed with respect to FIG. 3. In some embodiments, the user group classifier 156 may be trained with user group training data 158 correlating user data 108 to one or more user data groups 148. For the purposes of this disclosure, "training data" is data containing correlations that a machine-learning process may use to model relationships between two or more categories of data elements. In some embodiments, processor 104 may receive user group training data 158 from a database. The training data disclosed herein is further disclosed with respect to FIG. 3.

With continued reference to FIG. 1, in an embodiment, a user group classifier 156 may be trained with user group training data 158 correlating user reputation data 114 to a user reputation group 150 of one or more user data groups 148. As a non-limiting example, the user group classifier 156 may be trained with user group training data 158 that correlates user information of the user reputation data 114 of the user data 108 to a user information group of the user reputation group 150 of the one or more user data groups 148. For example, and without limitation, the user group training data 158 may correlate a name of a user 116 to the user information group. As another non-limiting example, the user group classifier 156 may be trained with user group training data 158 that correlates positive user reputation of the user reputation data 114 of the user data 108 to a positive user reputation group of the user reputation group 150 of the one or more user data groups 148. For example, and without limitation, the user group training data 158 may correlate a 5 star review in a review related to a user 116 to a review group of the positive user reputation group. As another non-limiting example, the user group classifier 156 may be trained with user group training data 158 that correlates negative user reputation of the user reputation data 114 of the user data 108 to a negative user reputation group of the user reputation group 150 of the one or more user data groups 148. For example, and without limitation, the user group training data 158 may correlate a word 'poor' in a comment related to the user 116 to a keyword group and a comment group of the negative user reputation group.

With continued reference to FIG. 1, in another embodiment, a user group classifier 156 may be trained with user group training data 158 correlating initial activity data 118 to an initial activity group 152 of one or more user data groups 148. As a non-limiting example, the user group classifier 156 may be trained with user group training data 158 that correlates initial activity information of the initial activity data 118 of the user data 108 to an initial activity information group of the initial activity group 152 of the one or more user data groups 148. For example, and without limitation, the user group training data 158 may correlate a name of a project to the initial activity information group. For another example, and without limitation, the user group training data 158 may correlate a fund status of the project to a fund status group of a financial information group of the initial activity information group. As another non-limiting example, the user group classifier 156 may be trained with user group training data 158 that correlates initial proposal of the initial activity data 118 of the user data 108 to an initial proposal group of the initial activity group 152 of the one or more user data groups 148. For example and without limitation, the user group training data 158 may correlate fiat money of $45000 of the initial proposal to an amount of proposal group and a fiat money group of the initial proposal group.

With continued reference to FIG. 1, in some embodiments, user group training data 158 may be stored in an activity database 112. In some embodiments, the user group training data 158 may be received from a user 116, a creator 120, activity database 112, external computing devices, and/or previous iterations of processing. As a non-limiting example, the user group training data 158 may include instructions from the user 116 stored in the activity database 112, where the instructions may include labeling examples.

With continued reference to FIG. 1, in some embodiments, user data 108 may be classified to one or more user data groups 148 using a user group lookup table. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, at least a processor 104 may 'lookup' given user data 108 to find a corresponding one or more user data groups 132 using a user group lookup table. In an embodiment, the at least a processor 104 may 'lookup' given user reputation data 114 of the user data 108 and find a corresponding a user reputation group of the one or more user data groups 148 using the user group lookup table. As a non-limiting example, the user group lookup table may correlate user information of the user reputation data 114 of the user data 108 to a user information group of the user reputation group 150 of the one or more user data groups 148. For example, and without limitation, the user group lookup table may correlate a name of a user 116 to the user information group. As another non-limiting example, the user group lookup table may correlate positive user reputation of the user reputation data 114 of the user data 108 to a positive user reputation group of the user reputation group 150 of the one or more user data groups 148. For example and without limitation, the user group lookup table may correlate a 5 star review in a review related to a user 116 to a review group of the positive user reputation group. As another non-limiting example, the user group lookup table may correlate negative user reputation of the user reputation data 114 of the user data 108 to a negative user reputation group of the user reputation group 150 of the one or more user data groups 148. For example and without limitation, the user group lookup table may correlate a word 'poor' in a comment related to the user 116 to a keyword group and a comment group of the negative user reputation group.

With continued reference to FIG. 1, in another embodiment, at least a processor 104 may 'lookup' given initial activity data 118 to find a corresponding initial activity group 152 of one or more user data groups 148 using the user group lookup table. As a non-limiting example, the user group lookup table may correlate initial activity information of the initial activity data 118 of the user data 108 to an initial activity information group of the initial activity group 152 of the one or more user data groups 148. For example and without limitation, the user group lookup table may correlate a name of a project to the initial activity information group. For another example and without limitation, the user group lookup table may correlate a fund status of the project to a fund status group of a financial information group of the initial activity information group. As another non-limiting example, the user group lookup table may correlate initial proposal of the initial activity data 118 of the user data 108 to an initial proposal group of the initial activity group 152 of the one or more user data groups 148. For example and without limitation, the user group lookup table may correlate fiat money of $45000 of the initial proposal to an amount of proposal group and a fiat money group of the initial proposal group.

With continued reference to FIG. 1, a memory 106 includes instructions configuring at least a processor 104 to determine a user reputation score 128. For the purposes of this disclosure, a "user reputation score" is a value representing an evaluation of a user's reputation. In some embodiments, the user reputation score 128 may be stored in an activity database 112. In some embodiments, the user reputation score 128 may be retrieved from the activity database 112. In an embodiment, the user reputation score 128 may include a quantitative characteristic, such as a numerical value. As a non-limiting example, the user reputation score 128 may be −230, −50, −7, −1, 0, 1, 2, 3, 5, 10, 20, 100, and the like, where a higher user reputation score 128 may associate with a positive user reputation and/or higher user reputation of a user 116 while a lower user reputation score 128 may associate with a negative user reputation and/or lower user reputation of the user 116. In some embodiments, the user reputation score 128 may start from 0, which may mean that the user 116 may not include either positive user reputation or negative user reputation. In some embodiments, the user reputation score 128 may be updated in real-time as the at least a processor 104 receives new user reputation data 114.

With continued reference to FIG. 1, in another embodiment, a user reputation score 128 may include a quality characteristic, such as a color coding, where each color may be associated with a level of the user 116's reputation. As a non-limiting example, the user reputation score 128 may be red, where red may represent a low and/or negative user 116's reputation. As another non-limiting example, the user reputation score 128 may be green, where green may represent a high and/or positive user 116's reputation. As another non-limiting example, the user reputation score 128 may include a grey scale, where the user reputation score 128 is light grey when the user 116's reputation is low and/or negative while the user reputation score 128 gets darker the user reputation score 128 increases. In some embodiments, the user reputation score 128 may include low to high scoring. As a non-limiting example, the user reputation score 128 may be 'low' when there is the user 116's reputation is low and/or negative and the user reputation score 128 may be 'high' when the user 116's reputation is high and/or positive.

With continued reference to FIG. 1, in an embodiment, at least a processor 104 may increase a user reputation score 128 as a function of a user reputation group 150. As a non-limiting example, the at least a processor 104 may be configured to increase the user reputation score 128 when user reputation data 114 in a positive user reputation group of the user reputation group 150 increases. In another embodiment, the at least a processor 104 may decrease the user reputation score 128 as a function of the user reputation group 150. As a non-limiting example, the at least a processor 104 may be configured to decrease the user reputation score 128 when user reputation data 114 in a negative user reputation group of the user reputation group 150 increases.

With continued reference to FIG. 1, in an embodiment, a user 116 may manually determine a user reputation score 128. In another embodiment, at least a processor 104 may determine the user reputation score 128 as a function of a user reputation group 150 of one or more user data groups 148. In an embodiment, the user reputation score 128 may be proportion to a number of user reputation data 114 in the user reputation group 150. As a non-limiting example, a number of positive user reputation of the user reputation data 114 in a positive user reputation group of the user reputation group 150 may proportionally increase the user reputation score 128, while a number of negative user reputation in a negative user reputation group of the user reputation group 150 may proportionally decrease the user reputation score 128. For example and without limitation, when the positive user reputation in a social media group, review group and text group of the positive user reputation group includes 4, 3 and 2 and the user reputation score 128 starts from 0, the user reputation score 128 may increase to 9. For another example and without limitation, when the negative user reputation in a social media group, audio group, image group and keyword group include 5, 0, 1 and 2 and the user reputation score 128 starts from 0, the user reputation score 128 may decrease to −7.

With continued reference to FIG. 1, in an embodiment, at least a processor 104 may determine a user reputation score 128 using a user reputation scoring range. For the purposes of this disclosure, a "user reputation scoring range" is a range of numbers for determining a user reputation score. In some embodiments, the user reputation scoring range may represent a number of user reputation data 114 in the user reputation groups 150. In some embodiments, the user reputation scoring range may include a quantitative characteristic, such as a numerical value. As a non-limiting example, the user reputation scoring range may include a range of numbers, such as without limitation 0-1, 0-3, 4-10, 11-20, 21-50, 51-100, and the like, where each of the user reputation score 128 may include the user reputation scoring range. For example without limitation, the user reputation score 128 may include 0 when a number of user reputation data 114 in a positive user reputation group of one or more user reputation groups 150 is within the user reputation scoring range of 0-2 for the user reputation score 128 of 0. For another example without limitation, the user reputation score 128 may include −3 when a number of user reputation data 114 in a negative user reputation group is within the user reputation scoring range of 10-15 for the user reputation score 128 of −3. For another example without limitation, the user reputation score 128 may include 1 when a number of user reputation data 114 in a comment group of a positive user reputation group of the user reputation group 150 of the one or more user data groups 148 is within the user reputation scoring range of 1-3 for the user reputation score 128 of 1. The user reputation scoring range may be any numerical value or a range of numbers thereof. In some embodiments, the user reputation scoring range may be stored in an activity database 112. In some embodiments, the user reputation scoring range may be retrieved from the activity database 112.

With continued reference to FIG. 1, in another embodiment, at least a processor 104 may determine a user reputation score 128 as a function of an initial activity group 152 of one or more user data groups 148. As a non-limiting example, the at least a processor 104 may determine the user reputation score 128 as a function of an initial proposal amount group of the initial proposal group. For example and without limitation, the at least a processor 104 may increase the user reputation score 128 when an amount of initial proposal in the initial proposal amount group of the initial proposal group is higher than a proposal amount threshold. As a non-limiting example, when the proposal amount threshold is $5,000,000 and the amount of initial proposal is $5,500,000, the user reputation score 128 may increase. For another example and without limitation, the at least a processor 104 may decrease the user reputation score 128 when the amount of initial proposal in the initial proposal amount group of the initial proposal group of the initial proposal group is lower than the proposal amount threshold. As a non-limiting example, when the proposal amount threshold is $5,500,000 and the amount of initial proposal is $5,000,000, the user reputation score 128 may decrease. For the purposes of this disclosure, a "proposal amount threshold" is a numerical value for determining a user reputation score using initial proposal. As a non-limiting example, the proposal amount threshold may include any amount of money such as but not limited to $50, $120, $3000, $100,000,000, and the like. In some embodiments, the proposal amount threshold may be stored in an activity database 112. I some embodiment, a user 116 and/or a creator 120 may predetermine the proposal amount threshold. In some embodiments, the proposal amount threshold may be retrieved from the activity database 112.

With continued reference to FIG. 1, in some embodiment, at least a processor 104 may determine a user reputation score 128 using a proposal amount weight. For the purposes of this disclosure, a "proposal amount weight" is a difference between a proposal amount threshold and an amount of initial proposal. The proposal amount weight may be calculated using the following formula: As a non-limiting example, when the proposal amount threshold is $5,000,000 and the amount of initial proposal is $5,500,000, the proposal amount weight may include 500,000. In some embodiments, the user reputation score 128 may be determined using the proposal amount weight and a user reputation scoring range. The user reputation scoring range disclosed herein is further described below. The user reputation scoring range may include a proposal amount weight scoring range. The proposal amount weight scoring range may be consistent with the user reputation scoring range. For the purposes of this disclosure, a "proposal amount weight scoring range" is a range of numbers for calculating a user reputation score using a proposal amount weight. As a non-limiting example, when the proposal amount weight is 0 and the proposal amount weight scoring range is 0-5,000 for the user reputation score 128 of 10, the user reputation score 128 may include 10. For another example without limitation, when the proposal amount weight is −500 and the proposal amount weight scoring range is −500-0 for the user reputation score 128 of 2, the user reputation score 128 may include 2. Persons skilled in the art, upon reviewing the entirety of this disclosure, may appreciate various ways of determining the user reputation score 128 that may be used in an apparatus 100.

With continued reference to FIG. 1, as a non-limiting example, at least a processor 104 may determine a user reputation score 128 as a function of a type of initial proposal group of initial proposal group of one or more user data groups 148. For example and without limitation, the at least a processor 104 may determine the user reputation score 128 as a function of a NFT group, cryptocurrency group, fiat money group, and the like, using a proposal type preference. For the purposes of this disclosure, a "proposal type preference" is a preference of a creator for a type of an initial proposal. As a non-limiting example, the proposal type preference may include NFT, cryptocurrency, fiat money, and the like. In some embodiments, the proposal type preference may be stored in an activity database 112. In some embodiments, a creator 120 may predetermine the proposal type preference. In some embodiments, the proposal type preference may be retrieved from the activity database 112. As a non-limiting example, when the proposal type preference is the fiat money and the type of initial proposal in the type of initial proposal group includes the fiat money, the at least a processor 104 may increase the user reputation score 128. As another non-limiting example, when the proposal type preference is the fiat money and the type of initial proposal in the type of initial proposal group includes the NFT, the at least a processor 104 may decrease the user reputation score 128. Persons skilled in the art, upon reviewing the entirety of this disclosure, may appreciate various ways of determining the user reputation score 128 that may be used in an apparatus 100.

With continued reference to FIG. 1, as a non-limiting example, at least a processor 104 may determine a user reputation score 128 as a function of a user information group and a critical user data group 154. As a non-limiting example, the at least a processor 104 may increase the user reputation score 128 when the name group of the user information group includes one or more same data in the critical user data group 154. The critical user data group 154 disclosed herein is further described above. For another example and without limitation, the at least a processor 104 may increase the user reputation score 128 when the name group of the user information group includes 'Matt Damon' as the critical user data group includes the 'Matt Damon.'

With continued reference to FIG. 1, in some embodiments, a user reputation score 128 may include a summation value of the user reputation scores 128 generated for a positive user reputation group, a negative user reputation group, an amount of initial proposal group and/or type of initial proposal group of one or more user data groups 148. The summation value disclosed herein is further described below. As a non-limiting example, when the user reputation score 128 generated for the positive user reputation group is 10, the user reputation score 128 generated for the negative user reputation group is −10, and the user reputation score 128 generated for the amount of initial proposal group is 20, the summation value of the initial activity score 132 may include 20.

With continued reference to FIG. 1, at least a processor 104 may determine a user reputation score 128 using a user score machine learning model 160. For the purposes of this disclosure, a "user score machine learning model" is a machine learning model that determines a user reputation score. The user score machine learning model 160 disclosed herein may be consistent with a machine learning model disclosed with respect to FIG. 3. The user score machine learning model 160 may be trained with user score training data 162. For the purposes of this disclosure, "user score training data" is training data that is used to train a user score machine learning model. The training data disclosed herein is further disclosed with respect to FIG. 3. In an embodiment, the user score training data 162 may correlate a user reputation group 150 of one or more user data groups 148 to the user reputation score 128. As a non-limiting example, the user score training data 162 may correlate a positive user reputation group to the user reputation score 128. For example and without limitation, the user score training data 162 may correlate a number of positive user reputation in the positive user reputation group, 15, to the user reputation score 128, 5. As another non-limiting example, the user score training data 162 may correlate a negative user reputation group to the user reputation score 128. For example and without limitation, the user score training data 162 may correlate a number of negative user reputation in the negative user reputation group, 10, to the user reputation score 128, −6.

With continued reference to FIG. 1, in another embodiment, user score training data 162 may correlate an initial proposal group of one or more user data groups 148 to a user reputation score 128. As a non-limiting example, the user score training data 162 may correlate an amount of initial proposal group to the user reputation score 128. For example and without limitation, the user score training data 162 may correlate an amount of initial proposal in the amount of initial proposal group, $500,000,000, to the user reputation score 128, 150, when a proposal amount threshold is $40,000,000. As another non-limiting example, the user score training data 162 may correlate a type of initial proposal group to the user reputation score 128. For example and without limitation, the user score training data 162 may correlate a type of initial proposal in the type of initial proposal group, NFT, to the user reputation score 128, −5, when a proposal type preference is fiat money.

With continued reference to FIG. 1, in another embodiment, user score training data 162 may correlate a user information group and a critical user data group 154 to a user reputation score 128. As a non-limiting example, the user score training data 162 may correlate a name in a name group of the user information group that includes the same name in the critical user data group 154 to the user reputation score 128. For another example and without limitation, the user score training data 162 may correlate the name in the name group of the user information group, 'Matt Damon,' and the name in the critical user data group 154, 'Matt Damon' to the user reputation score 128, 300. In some embodiments, the user score training data 162 may be stored in an activity database 112. In some embodiments, the user score training data 162 may be received from a user 116, a creator 120, the activity database 112, external computing devices, and/or previous iterations of processing. As a non-limiting example, the user score training data 162 may include instructions from the creator 120 stored in the activity database 112, where the instructions may include labeling examples.

With continued reference to FIG. 1, in some embodiments, at least a processor 104 may determine a user reputation score 128 using a user score lookup table. For the purposes of this disclosure, a "user score lookup table" is a lookup table that determines a user reputation score. The user score lookup table disclosed herein may be consistent with a lookup table disclosed above. In some embodiments, the at least a processor 104 may 'lookup' given one or more user data groups 148 to find a corresponding user reputation score 128 using the user score lookup table. In an embodiment, the at least a processor 104 may 'lookup' a user reputation group 150 of the one or more user data groups 148 to find the corresponding the user reputation score 128 using the user score lookup table. As a non-limiting example, the user score lookup table may correlate a positive user reputation group to the user reputation score 128. For example and without limitation, the user score lookup table may correlate a number of positive user reputation in the positive user reputation group, 15, to the user reputation score 128, 5. As another non-limiting example, the at least a processor 104 may 'lookup' a negative user reputation group to find the corresponding the user reputation score 128 using the user score lookup table. For example and without limitation, the user score lookup table may correlate a number of negative user reputation in the negative user reputation group, 10, to the user reputation score 128, −6.

With continued reference to FIG. 1, in another embodiment, at least a processor 104 may 'lookup' an initial activity group 152 of one or more user data groups 148 to find a corresponding user reputation score 128 using a user score lookup table. As a non-limiting example, the user score lookup table may correlate an amount of initial proposal group of the initial activity group 152 to the user reputation score 128. For example and without limitation, the user score lookup table may correlate an amount of initial proposal in the amount of initial proposal group, $500,000,000, to the user reputation score 128, 150, when a proposal amount threshold is $40,000,000. As another non-limiting example, the user score lookup table may correlate a type of initial proposal group of the initial activity group 152 to the user reputation score 128. For example and without limitation, the user score lookup table may correlate a type of initial proposal in the type of initial proposal group, NFT, to the user reputation score 128, −5, when a proposal type preference is fiat money.

With continued reference to FIG. 1, in another embodiment, at least a processor 104 may 'lookup' a user information group and a critical user data group 154 to find a corresponding user reputation score 128 using a user score lookup table. As a non-limiting example, the user score lookup table may correlate a name in a name group of the user information group that includes the same name in the critical user data group 154 to the user reputation score 128. For another example and without limitation, the user score lookup table may correlate the name in the name group of the user information group, 'Matt Damon,' and the name in the critical user data group, 'Matt Damon' to the user reputation score 128, 300.

With continued reference to FIG. 1, a memory 106 includes instructions configuring at least a processor 104 to determine an initial activity score 132. For the purposes of this disclosure, an "initial activity score" is a value representing an evaluation of a creator's project. In some embodiments, the initial activity score 132 may be stored in an activity database 112. In some embodiments, the initial activity score 132 may be retrieved from the activity database 112. In an embodiment, the initial activity score 132 may include a quantitative characteristic, such as a numerical value. As a non-limiting example, the initial activity score 132 may be −230, −50, −7, −1, 0, 1, 2, 3, 5, 10, 20, 100, and the like, where a higher initial activity score 132 may associate with a higher project value of a project of a creator 120 while a lower initial activity score 132 may associate with a lower project reputation of the project of the creator 120. In some embodiments, the initial activity score 132 may start from 0, which may mean that the value of the project is 0. The purposes of this disclosure, a "project value" is a value of a project of a creator that refers to as an ability to increase a reputation of a user. The higher project value may refer to as an ability of the project of the creator 120 to increase the user reputation more than the project that includes lower project value. In some embodiments, the initial activity score 132 may be updated in real-time as the at least a processor 104 receives new initial activity data 118.

With continued reference to FIG. 1, in another embodiment, an initial activity score 132 may include a quality characteristic, such as a color coding, where each color may be associated with a level of a project value. As a non-limiting example, the initial activity score 132 may be red, where red may represent a low project value. As another non-limiting example, the initial activity score 132 may be green, where green may represent a high project value. As another non-limiting example, the initial activity score 132 may include a grey scale, where the initial activity score 132 is light grey when the project value is low while the initial activity score 132 gets darker the initial activity score 132 increases. In some embodiments, the initial activity score 132 may include low to high scoring. As a non-limiting example, the initial activity score 132 may be 'low' when there is the project value is low and/or negative and the initial activity score 132 may be 'high' when project value is high and/or positive.

With continued reference to FIG. 1, a memory 106 includes instructions configuring at least a processor 104 to determine an initial activity score 132 as a function of an initial activity group 152 of one or more user data groups 148. In an embodiment, the at least a processor 104 may determine the initial activity score 132 as a function of an initial activity information group of the initial activity group 152. As a non-limiting example, the at least a processor 104 may determine the initial activity score 132 as a function of a people group of the initial activity information group and a critical user data group of the initial activity group 152. For example and without limitation, the at least a processor 104 may increase the initial activity score 132 when the people group of the initial activity information group includes one or more same data in a critical user data group. The critical user data disclosed herein is further described above. For another example and without limitation, the at least a processor 104 may increase the initial activity score 132 when the people group of the initial activity information group includes 'Matt Damon' as the critical user data group includes the 'Matt Damon.'

With continued reference to FIG. 1, as another non-limiting example, at least a processor 104 may determine an initial activity score 132 as a function of a financial information group of an initial activity information group of an initial activity group 152 of one or more user data groups 148. For example and without limitation, the at least a processor 104 may determine the initial activity score 132 as a function of a budget group of the financial information group of the initial activity information group. For another example and without limitation, the at least a processor 104 may increase the initial activity score 132 when a project budget in the budget group of the financial information group of the initial activity information group is higher than a project budget threshold. As a non-limiting example, when the project budget threshold is $5,000,000 and the project budget is $5,500,000, the initial activity score 132 may increase. For another example and without limitation, the at least a processor 104 may decrease the initial activity score 132 when a project budget in the budget group of the financial information group of the initial activity information group is lower than a project budget threshold. As a non-limiting example, when the project budget threshold is $5,500,000 and the project budget is $5,000,000, the initial activity score 132 may decrease. For the purposes of this disclosure, a "project budget threshold" is a numerical value for determining an initial activity score. As a non-limiting example, the project budget threshold may include any amount of money such as but not limited to $50, $120, $3000, $100,000,000, and the like. In some embodiments, the project budget threshold may be stored in an activity database 112. I some embodiment, a user 116 and/or a creator 120 may predetermine the project budget threshold. In some embodiments, the project budget threshold may be retrieved from the activity database 112.

With continued reference to FIG. 1, in some embodiment, at least a processor 104 may determine an initial activity score 132 using a project budget weight. For the purposes of this disclosure, a "project budget weight" is a difference between a project budget threshold and a project budget. The project budget weight may be calculated using the following formula: As a non-limiting example, when the project budget threshold is $5,000,000 and the project budget is $5,500,000, the project budget weight may include 500,000. In some embodiments, the initial activity score 132 may be determined using the project budget weight and a project budget weight scoring range. The project budget weight scoring range may be consistent with a user reputation scoring range. For the purposes of this disclosure, a "project budget weight scoring range" is a range of numbers for calculating an initial activity score using a project budget weight. As a non-limiting example, when the project budget weight is 0 and the project budget weight scoring range is 0-5,000 for the initial activity score 132 of 10, the initial activity score 132 may include 10. For another example without limitation, when the project budget weight is −500 and the project budget weight scoring range is −500-0 for the initial activity score 132 of 2, the initial activity score 132 may include 2. Persons skilled in the art, upon reviewing the entirety of this disclosure, may appreciate various ways of determining the initial activity score 132 that may be used in an apparatus 100.

With continued reference to FIG. 1, in an embodiment, a creator 120 may manually determine an initial activity score 132. In another embodiment, the initial activity score 132 may include a summation value of the initial activity scores 132 generated for a people group and a budget group of an initial activity information group of an initial activity group 152 of one or more user data groups 148. For the purposes of this disclosure, "summation value" is a result value of a process of summing up numerical values. As a non-limiting example, when the initial activity score 132 generated for the people group is 35 and the initial activity score 132 generated for the budget group is 20, the summation value of the initial activity score 132 may include 55.

With continued reference to FIG. 1, at least a processor 104 may determine an initial activity score 132 using an activity score machine learning model 164. For the purposes of this disclosure, an "activity score machine learning model" is a machine learning model that determines an initial activity score. The activity score machine learning model 164 disclosed herein may be consistent with a machine learning model disclosed with respect to FIG. 3. The activity score machine learning model 164 may be trained with activity score training data 166. For the purposes of this disclosure, "activity score training data" is training data that is used to train an activity score machine learning model. The training data disclosed herein is further disclosed with respect to FIG. 3. In some embodiments, the activity score training data 166 may correlate an initial activity group 152 of one or more user data groups 148 to the initial activity score 132. In some embodiments, the activity score training data 166 may correlate an initial activity information group of the initial activity group 152 to the initial activity score 132. As a non-limiting example, the activity score training data 166 may correlate a people group of the initial activity information group and a critical user data group of the initial activity group 152 to the initial activity score 132. For example and without limitation, the activity score training data 166 may correlate names of people related to an initial activity in the people group and names of critical users in the critical user data group to the initial activity score 132. For example and without limitation, the activity score training data 166 may correlate 'Matt Damon' in the people group and 'Matt Damon' in the critical user data group 154 to the initial activity score 132, 300. As another non-limiting example, the activity score training data 166 may correlate a budget group of the initial activity information group to the initial activity score 132. For example and without limitation, the activity score training data 166 may correlate a project budget in the budget group, $3,300,000 to the initial activity score 132, −10, when a project budget threshold is $4,000,000. In some embodiments, the activity score training data 166 may be stored in an activity database 112. In some embodiments, the activity score training data 166 may be received from a user 116, a creator 120, the activity database 112, external computing devices, and/or previous iterations of processing. As a non-limiting example, the activity score training data 166 may include instructions from the creator 120 stored in the activity database 112, where the instructions may include labeling examples.

With continued reference to FIG. 1, in some embodiments, at least a processor 104 may determine an initial activity score 132 using an activity score lookup table. For the purposes of this disclosure, an "activity score lookup table" is a lookup table that determines an initial activity score. The activity score lookup table disclosed herein may be consistent with a lookup table disclosed above. In some embodiments, the at least a processor 104 may 'lookup' given initial activity group 152 of one or more user data groups 148 to find the corresponding the initial activity score 132 using the activity score lookup table. In some embodiments, the activity score lookup table may correlate an activity information group of the initial activity group 152 to the initial activity score 132. As a non-limiting example, the activity score lookup table may correlate a people group of the initial activity information group and a critical user data group of the initial activity group 152 to the initial activity score 132. For example and without limitation, the activity score lookup table may correlate names of people related to an initial activity in the people group and names of critical users in the critical user data group to the initial activity score 132. For example and without limitation, the activity score lookup table may correlate 'Matt Damon' in the people group and 'Matt Damon' in the critical user data group 154 to the initial activity score 132, 300. As another non-limiting example, the activity score lookup table may correlate a budget group of the initial activity information group to the initial activity score 132. For example and without limitation, the activity score lookup table may correlate a project budget in the budget group, $3,300,000 to the initial activity score 132, −10, when a project budget threshold is $4,000,000.

With continued reference to FIG. 1, a memory 106 includes instructions configuring at least a processor 104 to analyze a compatibility of a user 116 and an initial activity 124 of a creator 120. For the purposes of this disclosure, "compatibility" is a value representing a relevancy of a user and an initial activity. In some embodiments, the compatibility may include a compatibility level 136. For the purposes of this disclosure, a "compatibility level" is a level of a compatibility of a user and an initial activity. In some embodiments, the compatibility level may include level 0, level 1, level 2, level 3, and the like, where the level 0 may include the least compatibility and the level 3 may include the most compatibility. "Level 0," "Level 1," "Level 2," "Level 3," and the like are exemplary labels for levels only; as a non-limiting example, "Level 0" represents the lowest level in a series of levels. Alternatively, in some embodiments, the compatibility level may include level very low, level low, level moderate, level high, level very high, and the like, where the level very low may include the least compatibility and the level very high may include the most compatibility. Persons skilled in the art, upon reviewing the entirety of this disclosure, may appreciate various compatibility level 136 that can be used in an apparatus 100.

With continued reference to FIG. 1, a memory 106 includes instructions configuring at least a processor 104 to analyze a compatibility of a user 116 and an initial activity 124 of a creator 120 by comparing a user reputation score 128 and an initial activity score 132. In an embodiment, a compatibility level 136 of the compatibility may include a level 3 when the user reputation score 128 is higher than the initial activity score 132. As a non-limiting example, the compatibility level 136 may include a level 3 when the user reputation score 128 is 300 and the initial activity score 132 is 250. In another embodiment, the compatibility level 136 of the compatibility may include a level 2 when the user reputation score 128 same as the initial activity score 132. As a non-limiting example, the compatibility level 136 may include a level 2 when the user reputation score 128 is 300 and the initial activity score 132 is 300. In another embodiment, the compatibility level 136 of the compatibility may include a level 1 when the user reputation score 128 is lower than the initial activity score 132 but within a rejection threshold. As a non-limiting example, the compatibility level 136 may include a level 1 when the user reputation score 128 is 250, the initial activity score 132 is 300 and the rejection threshold is 100. For the purposes of this disclosure, a "rejection threshold" is a numerical value that is used to determine a compatibility level. As a non-limiting example, the rejection threshold may include 1, 15, 49, 100, 20000, and the like. In some embodiments, the rejection threshold may be manually determined by a creator 120. In some embodiments, the rejection threshold may be stored and/or retrieved in and/or from an activity database 112.

With continued reference to FIG. 1, in some embodiments, a compatibility level 136 may be determined using a difference between an initial activity score 132 and a user reputation score 128, where the user reputation score 128 is a positive value. In an embodiment, when a difference between the initial activity score 132 and the user reputation score 128: is below the rejection threshold, the compatibility level 136 may include a level 1. In another embodiment, when the difference between the initial activity score 132 and the user reputation score 128 is above or equal to the rejection threshold, the compatibility level 136 may include a level 0. As a non-limiting example, the compatibility level 136 may include the level 0 when the initial activity score 132 is 300, the user reputation score is 120 and the rejection threshold is 50.

With continued reference to FIG. 1, in some embodiments, a compatibility level 136 may be determined by adding a user reputation score 128 to an initial activity score 132, where the user reputation score 128 is a negative value. In an embodiment, when a value resulted from adding the user reputation score 128 to the initial activity score 132, where the user reputation score 128 is a negative value: is greater than the rejection threshold, the compatibility level 136 may include a level 1. In another embodiment, when a value resulted from adding the user reputation score 128 to the initial activity score 132, where the user reputation score 128 is a negative value, is smaller or equal to the rejection threshold, the compatibility level 136 may include a level 0. As a non-limiting example, the compatibility level 136 may include the level 0 when the initial activity score 132 is 10, the user reputation score is −20 and the rejection threshold is 0.

With continued reference to FIG. 1, in some embodiments, a compatibility level 136 may be determined as a function of an initial proposal in an initial proposal group of initial activity group 152 and a proposal amount preference. For the purposes of this disclosure, a "proposal amount preference" is a preference of a creator for an amount of an initial proposal. The proposal amount preference may include any numerical value such as but not limited to 100, 300, 500, 2000, 50000, 12300000, and the like. In some embodiments, a creator 120 may manually determine the proposal amount preference. In some embodiments, the proposal amount preference may be stored and/or retrieved in and/or from an activity database 112. In some embodiments, when the initial proposal is bigger or equal to the proposal amount preference, the compatibility level 136 may increase. As a non-limiting example, when the compatibility level 136 is a level 1, the initial proposal is $800,000 and the proposal amount preference is $750,000, the compatibility level 136 may be changed to a level 2. As another non-limiting example, when the compatibility level 136 is a level 2, the initial proposal is $800,000 and the proposal amount preference is $750,000, the compatibility level 136 may be changed to a level 3. A level 0 of the compatibility level 136 may not be subject to change as a function of the proposal amount preference. In other words, once the compatibility level 136 is the level 0, the compatibility level 136 may not be changed using the proposal amount preference.

With continued reference to FIG. 1, at least a processor 104 may determine a compatibility level 136 of a compatibility of a user 116 and an initial activity 124 of a creator 120 using a compatibility machine learning model 168. For the purposes of this disclosure, a "compatibility machine learning model" is a machine learning model that determines a compatibility level. The compatibility machine learning model 168 disclosed herein may be consistent with a machine learning model disclosed with respect to FIG. 3. The compatibility machine learning model 168 may be trained with compatibility training data 170. For the purposes of this disclosure, "compatibility training data" is training data that is used to train a compatibility machine learning model. The compatibility training data disclosed herein is further disclosed with respect to FIG. 3. In some embodiments, the compatibility training data 170 may correlate an initial activity score 132 and a user reputation score 128 to the compatibility level 136. As a non-limiting example, the compatibility training data 170 may correlate a case when the user reputation score 128 is higher than the initial activity score 132 to a level 3 of the compatibility level 136. As another non-limiting example, the compatibility training data 170 may correlate a case where the user reputation score 128 is equal to the initial activity score 132 to a level 2 of the compatibility level 136. As another non-limiting example, the compatibility training data 170 may correlate a case when the user reputation score 128 lower than the initial activity score 132, where the user reputation score 128 is a positive value, and a difference between the initial activity score 132 and the user reputation score 128 is below a rejection threshold to a level 1 of the compatibility level 136. As another non-limiting example, the compatibility training data 170 may correlate a case when the user reputation score 128 lower than the initial activity score 132, where the user reputation score 128 is a positive value, and a difference between the initial activity score 132 and the user reputation score 128 is greater or equal to the rejection threshold to a level 0 of the compatibility level 136.

With continued reference to FIG. 1, as another non-limiting example, compatibility training data 170 may correlate a case when a user reputation score 128 lower than an initial activity score 132, where the user reputation score 128 is a negative value, and a summation value of the initial activity score 132 and the user reputation score 128 is greater than a rejection threshold to a level 1 of the compatibility level 136. As another non-limiting example, the compatibility training data 170 may correlate a case when the user reputation score 128 lower than the initial activity score 132, where the user reputation score 128 is a negative value, and a summation value of the initial activity score 132 and the user reputation score 128 is smaller or equal to the rejection threshold to a level 0 of the compatibility level 136. In some embodiments, the compatibility training data 170 may be stored in an activity database 112. In some embodiments, the compatibility training data 170 may be received from a user 116, a creator 120, the activity database 112, external computing devices, and/or previous iterations of processing. As a non-limiting example, the compatibility training data 170 may include instructions from the creator 120 stored in the activity database 112, where the instructions may include labeling examples.

With continued reference to FIG. 1, as another non-limiting example, compatibility training data 170 may correlate a case when a compatibility level 136 is a level 1, an initial proposal is $800,000 and a proposal amount preference is $750,000 to the compatibility level 136 of a level 2. As another non-limiting example, the compatibility training data 170 may correlate a case when the compatibility level 136 is a level 2, the initial proposal is $800,000 and the proposal amount preference is $750,000 to the compatibility level 136 of a level 3.

With continued reference to FIG. 1, in some embodiments, at least a processor 104 may determine a compatibility level 136 using a compatibility lookup table. For the purposes of this disclosure, a "compatibility lookup table" is a lookup table that determines a compatibility level. The compatibility lookup table disclosed herein may be consistent with a lookup table disclosed above. In some embodiments, the at least a processor 104 may 'lookup' given case of an initial activity score and a user reputation score 128 to find a corresponding compatibility level 136 using the compatibility lookup table. As a non-limiting example, the compatibility lookup table may correlate a case when the user reputation score 128 is higher than the initial activity score 132 to a level 3 of the compatibility level 136. As another non-limiting example, the compatibility lookup table may correlate a case when the user reputation score 128 is equal to the initial activity score 132 to a level 2 of the compatibility level 136. As another non-limiting example, the compatibility lookup table may correlate a case when the user reputation score 128 lower than the initial activity score 132, where the user reputation score 128 is a positive value, and a difference between the initial activity score 132 and the user reputation score 128 is below a rejection threshold to a level 1 of the compatibility level 136. As another non-limiting example, the compatibility lookup table may correlate a case when the user reputation score 128 lower than the initial activity score 132, where the user reputation score 128 is a positive value, and a difference between the initial activity score 132 and the user reputation score 128 is greater or equal to the rejection threshold to a level 0 of the compatibility level 136.

With continued reference to FIG. 1, as another non-limiting example, a compatibility lookup table may correlate a case when a user reputation score 128 lower than an initial activity score 132, where the user reputation score 128 is a negative value, and a summation value of the initial activity score 132 and the user reputation score 128 is greater than a rejection threshold to a level 1 of the compatibility level 136. As another non-limiting example, the compatibility lookup table may correlate a case when the user reputation score 128 lower than the initial activity score 132, where the user reputation score 128 is a negative value, and a summation value of the initial activity score 132 and the user reputation score 128 is smaller or equal to the rejection threshold to a level 0 of the compatibility level 136.

With continued reference to FIG. 1, as another non-limiting example, a compatibility lookup table may correlate a case when a compatibility level 136 is a level 1, an initial proposal is $800,000 and a proposal amount preference is $750,000 to the compatibility level 136 of a level 2. As another non-limiting example, the compatibility lookup table may correlate a case when the compatibility level 136 is a level 2, the initial proposal is $800,000 and the proposal amount preference is $750,000 to the compatibility level 136 of a level 3.

With continued reference to FIG. 1, a memory 106 includes instructions configuring at least a processor 104 to determine an initial activity action 140. For the purposes of this disclosure, an "initial activity action" is an action a creator can take for an initial activity. In an embodiment, the initial activity action 140 may include an approval action. For the purposes of this disclosure, an "approval action" is an action that is configured to accept a user. For the purposes of this disclosure, "accepting a user" means a creator accepts a funding a user proposed to the creator for an initial activity. In another embodiment, the initial activity action 140 may include a rejection action. For the purposes of this disclosure, a "rejection action" is an action that is configured to reject a user. For the purposes of this disclosure, "rejecting a user" means a creator rejects a funding a user proposed to the creator for an initial activity.

With continued reference to FIG. 1, a memory 106 includes instructions configuring at least a processor 104 to determine an initial activity action 140 as a function of a compatibility of a user 116 and an initial activity 124 of a creator 120. In an embodiment, the at least a processor 104 may determine a rejection action of the initial activity action 140 for a level 0 of a compatibility level 136 of the compatibility. In another embodiment, the at least a processor 104 may determine an approval action of the initial activity action 140 for a level 3, level 2, and/or level 1 of the compatibility level 136 of the compatibility.

With continued reference to FIG. 1, in another embodiment, at least a processor 104 may generate a rejection action of an initial activity action 140 for a level 3, level 2, and/or level 1 of a compatibility level 136 of a compatibility as a function of a negative user reputation requirement. For the purposes of this disclosure, a "negative user reputation requirement" is an element that a creator does not want a user to have in user reputation. As a non-limiting example, when the compatibility level is a level 2 and a negative user reputation group of a user reputation group 150 includes the negative user reputation requirement, the at least a processor 104 may generate the rejection action. In some embodiments, the negative user reputation requirement may include a keyword. The keyword disclosed herein is further described above. For example and without limitation, the negative user reputation requirement may include any word for the keyword that a creator 120 does not want a user 116 to have in a negative user reputation group of a user reputation group 150. For another example and without limitation, the negative user reputation requirement may include any words related to gun, any words related to a specific politics, any words related to a specific religion, any words related to a serial killing, any words related to a specific world disaster, any words related to a specific person, and the like. In some embodiments, the creator 120 may manually input the negative user reputation requirement. In some embodiments, the negative user reputation requirement may be stored and/or retrieved in and/or from an activity database 112.

With continued reference to FIG. 1, in some embodiments, at least a processor 104 may generate an initial activity action 140 as a function of critical user data 126 of a critical user data group 154. As a non-limiting example, the at least a processor 104 may generate an approval action of the initial activity action 140 when a user information includes a name of a user 116 that is same as a name of a critical user in the critical user data group 154. The at least a processor 104 may generate the approval action of the initial activity action 140 for the user 116 with the same name as the critical user regardless of a compatibility level 136. As a non-limiting example, the at least a processor 104 may generate the approval action of the initial activity action 140 for the user 116 with the same name as the critical user even with the compatibility level includes a level 1. As another non-limiting example, the at least a processor 104 may generate the approval action of the initial activity action 140 for the user 116 with the same name as the critical user even with the compatibility level includes a level 0.

With continued reference to FIG. 1, in some embodiments, at least a processor 104 may generate an initial activity action 140 using an action machine learning model 172. For the purposes of this disclosure, an "action machine learning model" is a machine learning model that determines ab initial activity action. The action machine learning model 172 disclosed herein may be consistent with a machine learning model disclosed with respect to FIG. 3. The action machine learning model 172 may be trained with action training data 174. For the purposes of this disclosure, "action training data" is training data that is used to train an action machine learning model. The training data disclosed herein is further disclosed with respect to FIG. 3. In some embodiments, the action machine learning model 172 may be trained with the action training data 174 that correlates a compatibility level 136 to an initial activity action 140. As a non-limiting example, the action training data 174 may correlate a level 3 of the compatibility level 136 to an approval action of the initial activity action 140. As another non-limiting example, the action training data 174 may correlate a level 0 of the compatibility level 136 to a rejection action of the initial activity action 140. As another non-limiting example, the action training data 174 may correlate a level 1, level 2 of the compatibility level 136 to the approval action of the initial activity action 140. As another non-limiting example, the action training data 174 may correlate the level 1, level 2 of the compatibility level 136 to the rejection action of the initial activity action 140. For example and without limitation, the action training data 174 may correlate the level 1 of the compatibility level 136 with a negative user reputation requirement in a negative user reputation group of a user reputation group 150 to the rejection action of the initial activity action 140. As another non-limiting example, the action training data 174 may correlate a user information that includes a name of a user 116 that is same as a name of a critical user in a critical user data group 154 to the approval action of the initial activity action 140. In some embodiments, the action training data 174 may be stored in an activity database 112. In some embodiments, the action training data 174 may be received from a user 116, a creator 120, the activity database 112, external computing devices, and/or previous iterations of processing. As a non-limiting example, the action training data 174 may include instructions from the creator 120 stored in the activity database 112, where the instructions may include labeling examples.

With continued reference to FIG. 1, in some embodiments, at least a processor 104 may generate an initial activity action 140 using an activity lookup table. For the purposes of this disclosure, an "activity lookup table" is a lookup table that generates an initial activity action. The activity lookup table disclosed herein may be consistent with a lookup table disclosed above. In some embodiments, the at least a processor 104 may 'lookup' given compatibility level 136 to find a corresponding initial activity action 140 using the activity lookup table. As a non-limiting example, the activity lookup table may correlate a level 3 of the compatibility level 136 to an approval action of the initial activity action 140. As another non-limiting example, the activity lookup table may correlate a level 0 of the compatibility level 136 to a rejection action of the initial activity action 140. As another non-limiting example, the activity lookup table may correlate a level 1, level 2 of the compatibility level 136 to the approval action of the initial activity action 140. As another non-limiting example, the activity lookup table may correlate the level 1, level 2 of the compatibility level 136 to the rejection action of the initial activity action 140. For example and without limitation, the activity lookup table may correlate the level 1 of the compatibility level 136 with a negative user reputation requirement in a negative user reputation group of a user reputation group 150 to the rejection action of the initial activity action 140. As another non-limiting example, the activity lookup table may correlate a user information that includes a name of a user 116 that is same as a name of a critical user in a critical user data group 154 to the approval action of the initial activity action 140.

With continued reference to FIG. 1, a memory 106 includes instructions configuring at least a processor 104 to generate an exposure action item 144 as a function of an initial activity action 140. In some embodiments, the at least a processor 104 may be configured to generate the exposure action item 144 for an approval action of the initial activity action 140. For the purposes of this disclosure, an "exposure action item" is an element of exposure actions for a user in return of a funding for an initial activity. For the purposes of this disclosure, an "exposure action" is an action for exposure of a user. For the purposes of this disclosure, "exposure" is any activities that can enhance or improve reputation of a user. any activity that In some embodiments, the exposure action item 144 may expose a user 116 or anything related to the user 116 to a third party. The exposure action item 144 may increase a positive user reputation of the user 116. As a non-limiting example, the exposure action item 144 may include generating advertisements, hosting events, posting posts in social media, putting a name of the user 116 in a credit list of an initial activity 124, putting a name of the user 116 in events related to the initial activity 124, putting a photo of the user 116 in a poster related to the initial activity 124, mentioning the user 116 in an interview related to the initial activity 124, giving positive reviews about the user 116 on a website, donating money to an entity in the name of the user 116, and/or any methods that may enhance the user 116's positive user reputation. Persons skilled in the art, upon reviewing the entirety of this disclosure, may appreciate various methods that may be used as the exposure action item 144. In some embodiments, the exposure action item 144 may be stored in an activity database 112. In some embodiments, the exposure action item 144 may be retrieved from the activity database 112. In some embodiments, a creator 120 may manually input the exposure action item 144.

With continued reference to FIG. 1, in some embodiments, at least a processor 104 may be configured to generate an exposure action item 144 for a rejection action of an initial activity action 140, where the exposure action item 144 may include a second activity recommendation. For the purposes of this disclosure, a "second activity recommendation" is a recommendation for a user to fund instead of an initial activity. As a non-limiting example, the second activity recommendation may include other initial activities stored in an apparatus 100. The other initial activities may include other initial activities of a creator 120. The other initial activities may include initial activities of another creator. As another non-limiting example, the second activity recommendation may include other initial activities that includes better compatibility with a user 116. As another non-limiting include the second activity recommendation may include other initial activities that includes a level 3 of a compatibility level 136.

With continued reference to FIG. 1, in some embodiments, when an initial activity action 140 is an approval action, an initial activity score 132 of an initial activity 124 may be updated. For the purposes of this disclosure, "updating" refers to bringing something up to date. As a non-limiting example, the initial activity score 132 may be updated by adding a user reputation score 128 to the initial activity score 132. For example and without limitation, when the initial activity score 132 is 20, the user reputation score 128 is 35 and the initial activity action includes the approval action, the updated initial activity score 132 may updated to 55.

With continued reference to FIG. 1, in some embodiments, a memory 106 includes instructions configuring at least a processor 104 to display any data disclosed in the entirety of this disclosure. As a non-limiting example, the at least a processor 104 may display user reputation score 128, initial activity score 132, compatibility level 136, initial activity action 140, exposure action item 144, and/or the like. The data may include various formats such as but not limited to text, video, image, audio, and the like. The at least a processor 104 may be configured to generate a user interface displaying the data described above. For the purposes of this disclosure, a "user interface" is a means by which a user and/or a creator and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, the user 116 and/or the creator 120 may interact with user interface in virtual reality. In some embodiments, the user 116 and/or the creator 120 may interact with the use interface using a computing device distinct from and communicatively connected to at least a processor 104. In an embodiment, user interface may include a graphical user interface. A "graphical user interface," as used herein, is a graphical form of user interface that allows users and creators to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this may include pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Using an icon may be a fast way to open documents, run programs etc. because clicking on them yields instant access. Information contained in user interface may be directly influenced using graphical control elements such as widgets. A "widget," as used herein, is a user control element that allows a user and a creator to control and change the appearance of elements in the user interface. In this context a widget may refer to a generic GUI element such as a check box, button, or scroll bar to an instance of that element, or to a customized collection of such elements used for a specific function or application such as without limitation a dialog box for the users 116 and/or the creators 120 to customize their computer screen appearances. User interface controls may include software components that a user interacts with through direct manipulation to read or edit information displayed through user interface. Widgets may be used to display lists of similar items, navigate the system using links, tabs, and manipulate data using check boxes, radio boxes, and the like.

With continued reference to FIG. 1, in some embodiments, at least a processor 104 may display data on a remote device. For the purposes of this disclosure, a "remote device" is any device a user and a creator have. In an embodiment, the remote device may include a laptop, tablet, mobile phone, smart watch, or things of the like. The remote device may include an interface configured to receive inputs from a user 116 and/or a creator 120. The inputs may include user data 108 described above. In some embodiments, the remote device may display user reputation score 128, initial activity score 132, compatibility level 136, initial activity action 140, exposure action item 144, and/or the like to the user 116 and/or the creator 120.

Figure 2:
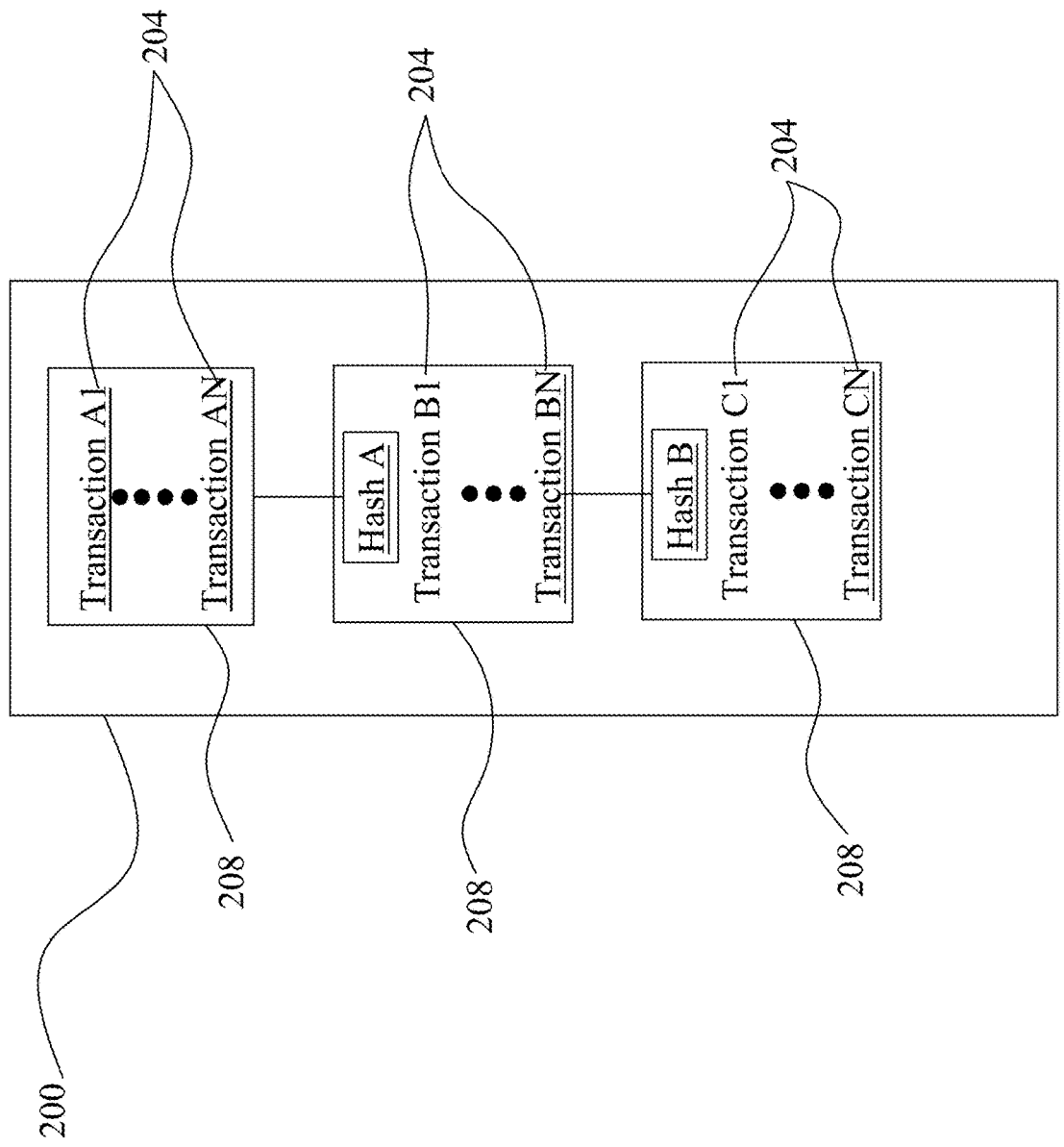
FIG. 2 is a block diagram of exemplary embodiment of an immutable sequential listing.

Referring now to FIG. 2, an exemplary embodiment of an immutable sequential listing 200 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing 200 may be, include and/or implement an immutable ledger, where data entries that have been posted to immutable sequential listing 200 cannot be altered. Data elements are listed in immutable sequential listing 200; data elements may include any form of data, including textual data, image data, encrypted data, cryptographically hashed data, and the like. Data elements include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

With continued reference to FIG. 2, a digitally signed assertion 204 may describe a transfer of a NFT and/or virtual currency, such as crypto currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

With continued reference to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and with continued reference to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

With continued reference to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

With continued reference to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

With continued reference to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

With continued reference to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital currency such as Bitcoins, Peercoins, Namecoins, and Litecoins. Crypto-currency may be a clone of another crypto-currency. The crypto-currency may be an "altcoin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
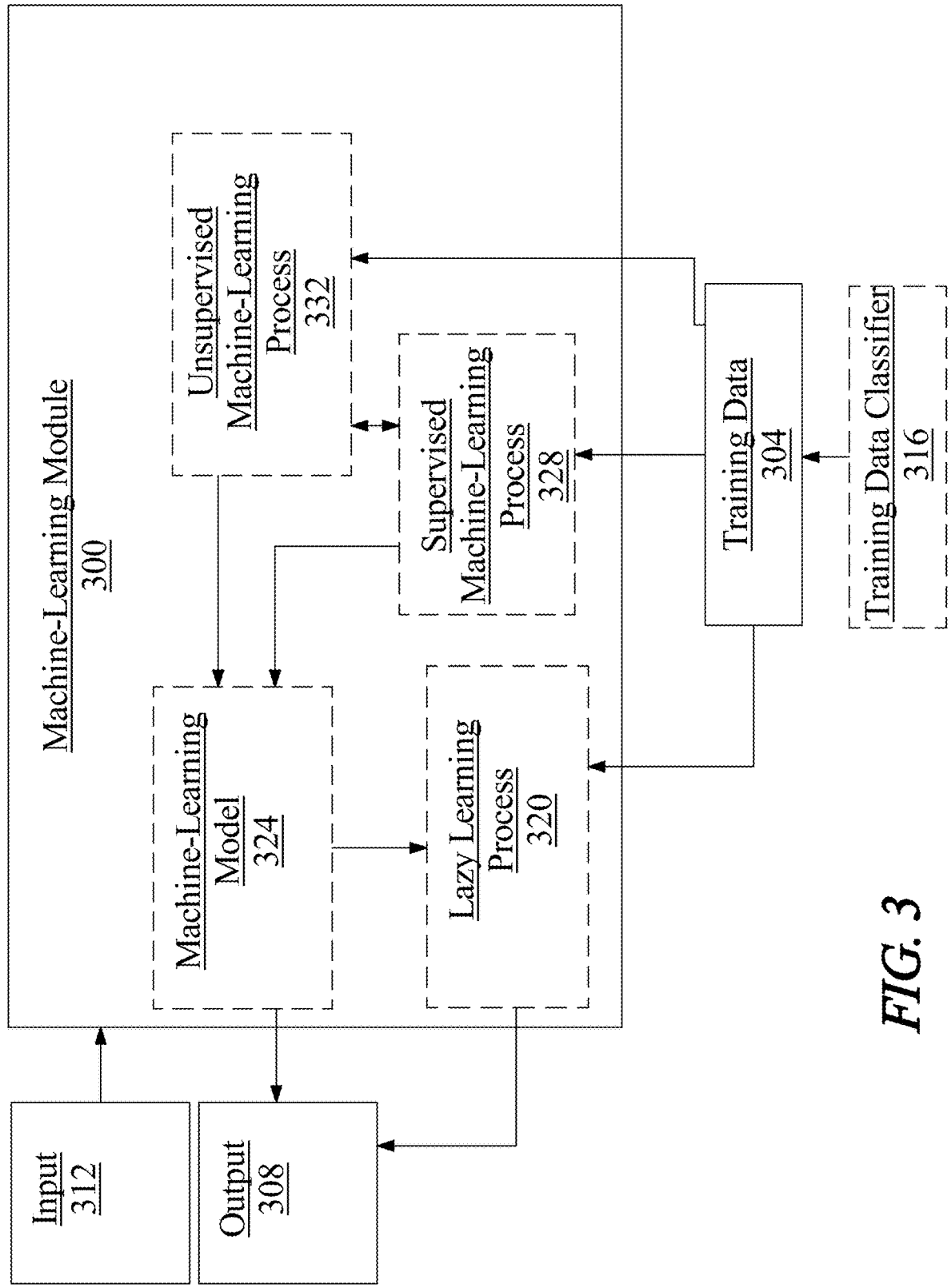
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

With continued reference to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

With continued reference to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With continued reference to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
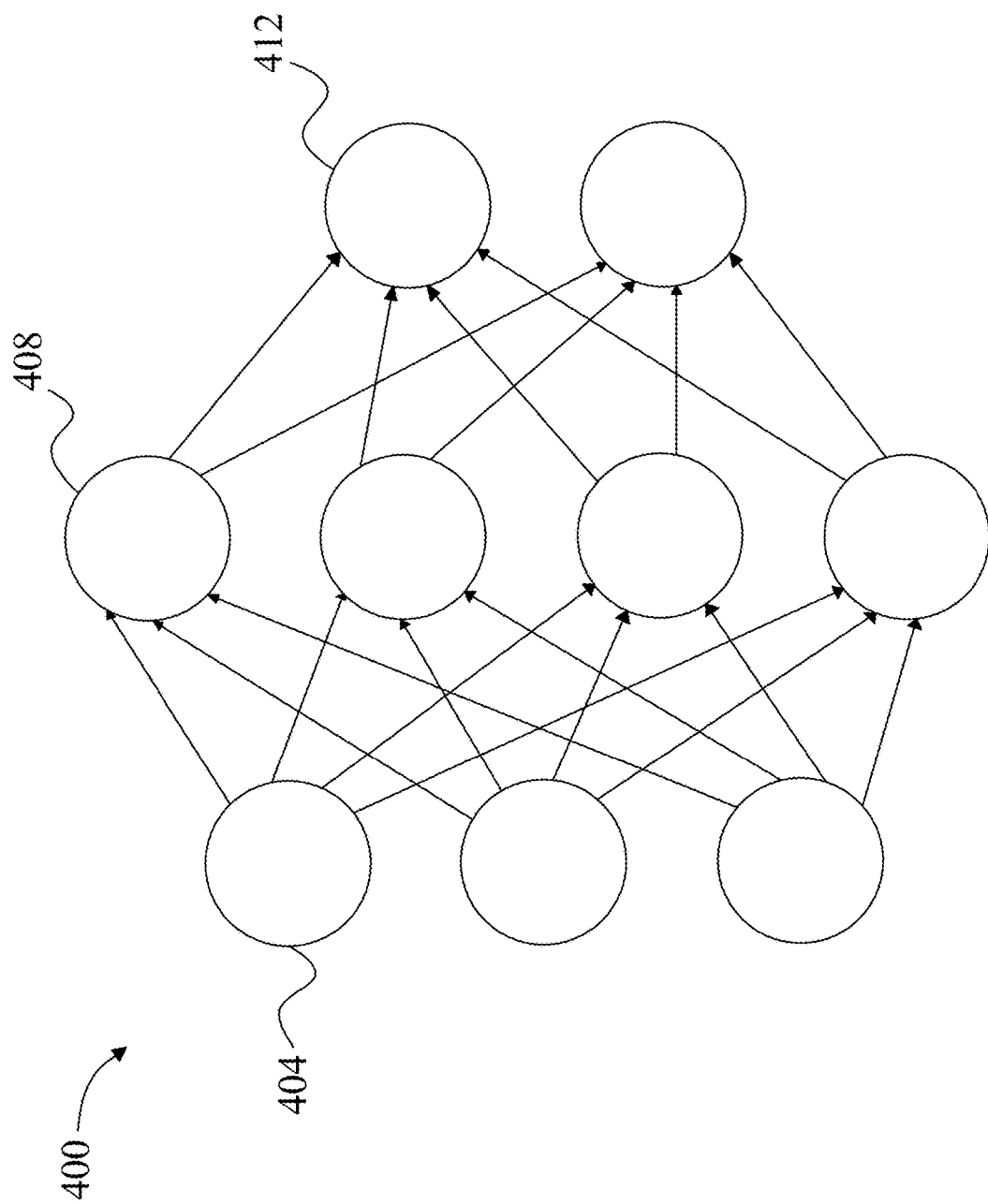
FIG. 4 is a diagram of an exemplary nodal network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
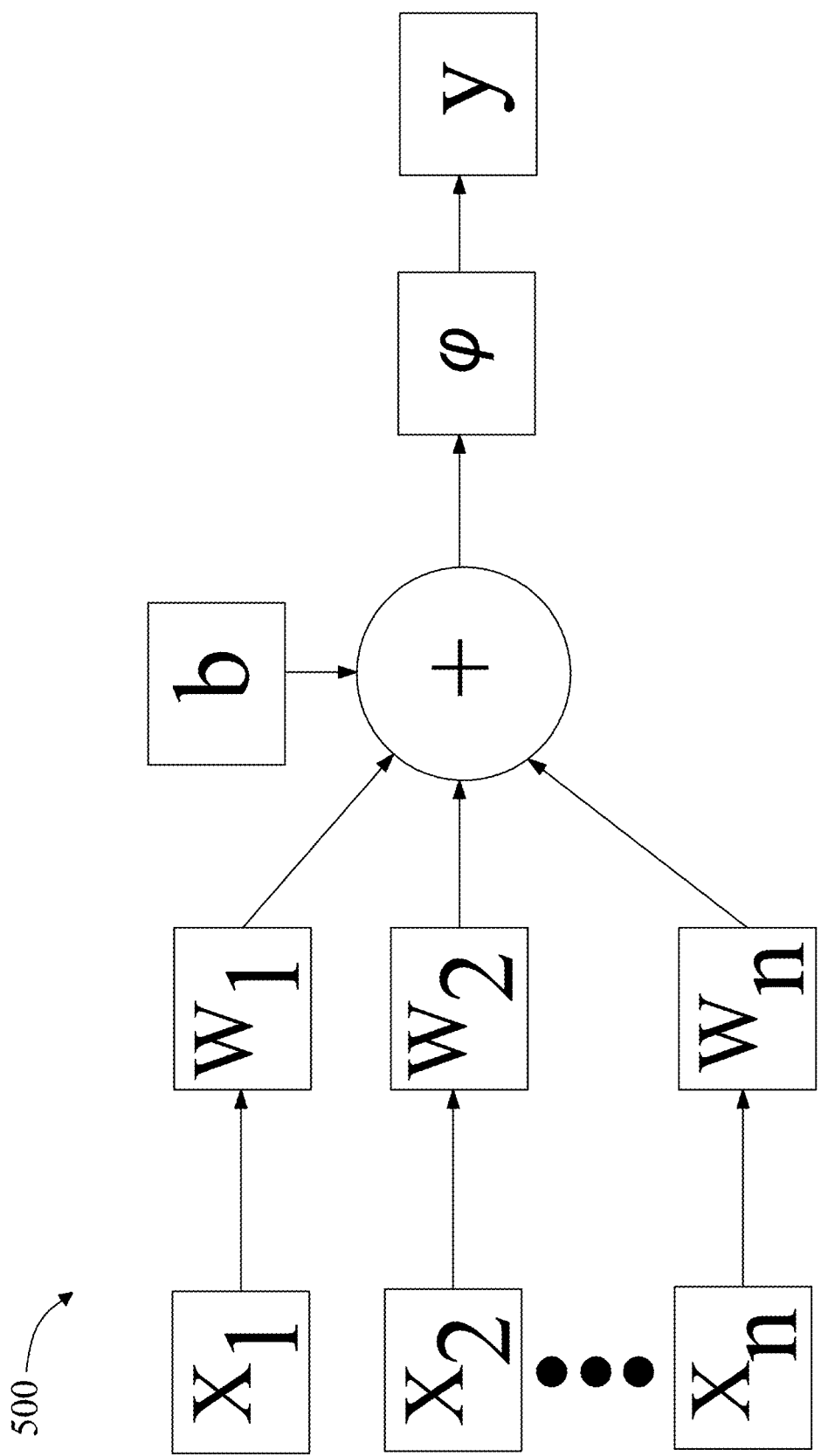
FIG. 5 is a block diagram of an exemplary node.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
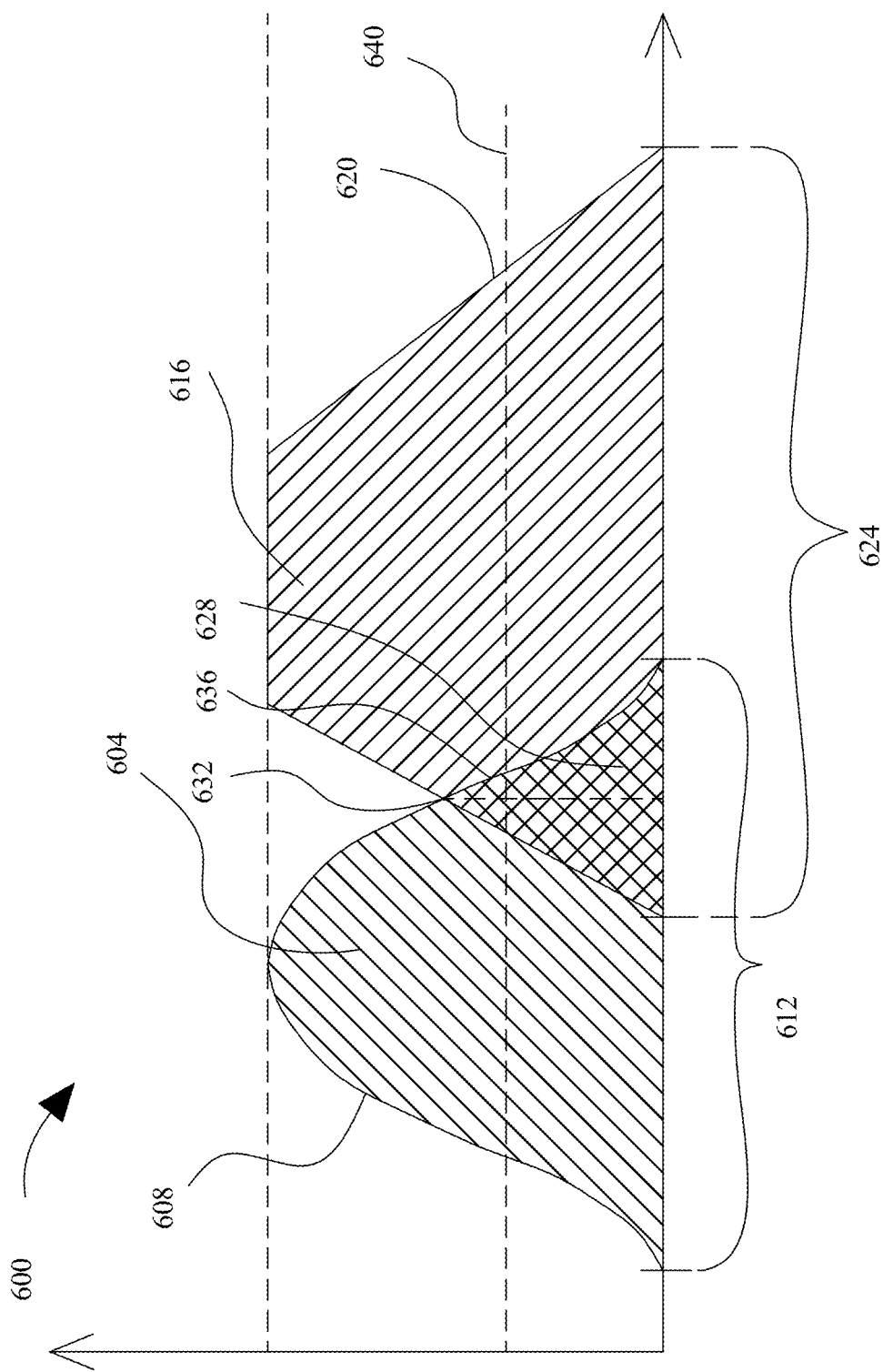
FIG. 6 is a block diagram of a fuzzy set system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or user data and/or an assessed user data groups, any calculated data from the user data and the user data groups, such as but not limited to a user reputation score, project score, compatibility score, user reputation action item, initial activity item, alone or in combination. Alternatively or additionally, each threshold may be tuned by a machine-learning and/or statistical process, for instance and without limitation as described in further detail below.

With continued reference to FIG. 6, in an embodiment, a degree of match between fuzzy sets may be used to rank any data and/or groups in the entirety of this disclosure. For instance, if user data has a fuzzy set that matches a user data group fuzzy set by having a degree of overlap exceeding a threshold, processor may rank user data groups. Where multiple fuzzy matches are performed, degrees of match for each respective fuzzy set may be computed and aggregated through, for instance, addition, averaging, or the like, to determine an overall degree of match.

With continued reference to FIG. 6, in an embodiment, user data may be compared to multiple user data group fuzzy sets. For instance, user profile may be represented by a fuzzy set that is compared to each of the multiple user data group fuzzy sets; and a degree of overlap exceeding a threshold between the user data fuzzy set and any of the multiple user data group fuzzy sets may cause processor 104 to rank user data groups as a function of the user data. For instance, in one embodiment there may be two user data group fuzzy sets, representing respectively a first user data group and a second user data group. First user data group may have a first fuzzy set; and Second user data group may have a second fuzzy set. Processor 104, for example, may compare a user data fuzzy set with each of the first and second user data group fuzzy sets, as described above, and classify a user profile to either, both, or neither of the first and second user data groups. Machine-learning methods as described throughout may, in a non-limiting example, generate coefficients used in fuzzy set equations as described above, such as without limitation x, c, and a of a Gaussian set as described above, as outputs of machine-learning methods. Likewise, user data may be used indirectly to determine a fuzzy set, as user data fuzzy set may be derived from outputs of one or more machine-learning models that take the user data such as products and/or data directly or indirectly as inputs.

With continued reference to FIG. 6, a computing device may use a logic comparison program, such as, but not limited to, a fuzzy logic model to determine a correlation between a plurality of user data and a plurality of user data groups. A correlation between user data and user data groups may include, but is not limited to, irrelevant, poor, average, high, and the like; each such designation may be represented as a value for a linguistic variable representing correlation, or in other words, a fuzzy set as described above that corresponds to a degree of positive correlations as calculated using any statistical, machine-learning, or other method that may occur to a person skilled in the art upon reviewing the entirety of this disclosure. In other words, a given element of user data object may have a first non-zero value for membership in a first linguistic variable value such as a high correlation and a second non-zero value for membership in a second linguistic variable value such as average correlation. In some embodiments, determining a correlation may include using a linear regression model. A linear regression model may include a machine learning model. A linear regression model may be trained using a machine learning process. A linear regression model may map statistics such as, but not limited to, degree of similarity with respect to the type of user data and user data groups. In some embodiments, determining a correlation between user data and user data groups may include using a classification model. The classification model may be configured to input collected data and cluster data to a centroid based on, but not limited to, frequency of appearance, linguistic indicators of correlation, and the like.

Centroids may include scores assigned to them such that level of correlation of user data and user data groups may each be assigned a score. In some embodiments, the classification model may include a K-means clustering model. In some embodiments, the classification model may include a particle swarm optimization model. In some embodiments, determining the classification model may include using a fuzzy inference engine. A fuzzy inference engine may be configured to map one or more elements of user data using fuzzy logic. In some embodiments, user data and user data groups may be arranged by a logic comparison program into various levels of correlation arrangements. A "correlation arrangement" as used in this disclosure is any grouping of objects and/or data based on degree of match. This step may be implemented as described above in FIGS. 1-5, 7. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Figure 7:
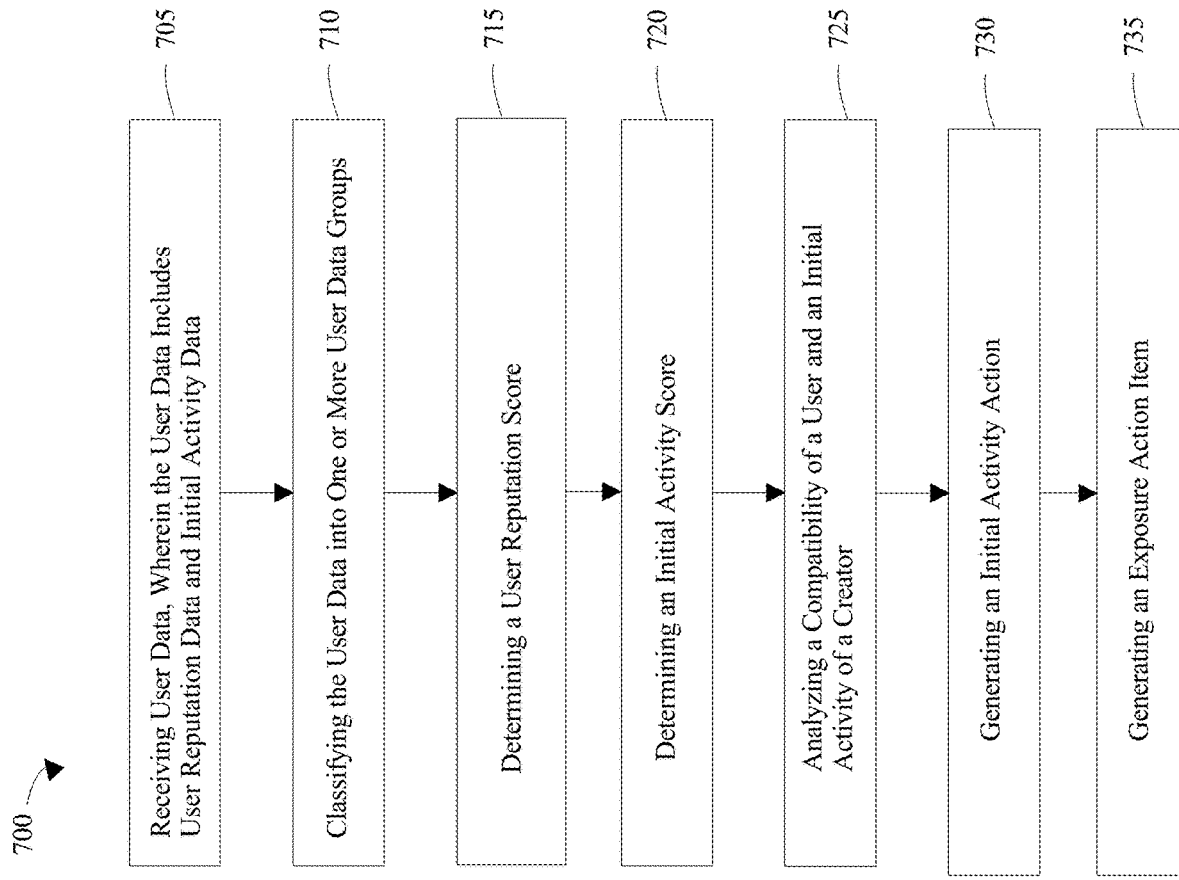
FIG. 7 is a flow diagram illustrating an exemplary method of assigning activities to a user and a creator.

Referring now to FIG. 7, a flow diagram of an exemplary method 700 for distributing activities to a user and a creator is illustrated. The method 700 includes a step 705 of receiving, using at least a processor, user data, wherein the user data includes user reputation data and initial activity data. In some embodiments, the user reputation data of the user data may include positive user reputation. In some embodiments, the user reputation data of the user data may include negative user reputation. In some embodiments, the initial activity data may further include critical user data, wherein the critical user data may include a name of a critical user. This may be implemented as disclosed with reference to FIGS. 1-6.

With continued reference to FIG. 7, a method 700 includes a step 710 of classifying, using at least a processor, user data into one or more user data groups, wherein the one or more user data groups includes a user reputation group and an initial activity group. In some embodiments, the user reputation group of the one or more user data groups may include a positive user reputation group, wherein the positive user reputation group may include a positive user reputation of user reputation data of the user data. In some embodiments, the user reputation group of the one or more user data groups may include a negative user reputation group, wherein the negative user reputation group may include a negative user reputation of the user reputation data of the user data. This may be implemented as disclosed with reference to FIGS. 1-6.

With continued reference to FIG. 7, a method 700 includes a step 715 of determining, using at least a processor, a user reputation score as a function of a user reputation group of one or more user data groups. The method 700 may further include increasing, using the at least a processor, the user reputation score when a positive user reputation of user reputation data in a positive user reputation group of the user reputation group of the one or more user data groups increases. The method 700 may further include decreasing, using the at least a processor, the user reputation score when a negative user reputation of the user reputation data in a negative user reputation group of the user reputation group of the one or more user data groups increases. This may be implemented as disclosed with reference to FIGS. 1-6.

With continued reference to FIG. 7, a method 700 includes a step 720 of determining, using at least a processor, an initial activity score as a function of an initial activity group of one or more user data groups. This may be implemented as disclosed with reference to FIGS. 1-6.

With continued reference to FIG. 7, a method 700 includes a step 725 of analyzing, using at least a processor, a compatibility of a user and an initial activity of a creator by comparing a user reputation score and an initial activity score. In some embodiments, the compatibility may include a compatibility level, wherein the compatibility level may include a level 0. This may be implemented as disclosed with reference to FIGS. 1-6.

With continued reference to FIG. 7, a method 700 includes a step 730 of generating, using at least a processor, an initial activity action as a function of a compatibility of a user and an initial activity of a creator. In some embodiments, the initial activity action may include an approval action. The method 700 may further include determining, using the at least a processor, the approval action of the initial activity action as a function of critical user data of initial activity data. In some embodiments, the initial activity action may include a rejection action, wherein the rejection action may be configured to reject the user. The method 700 may further include generating, using the at least a processor, the rejection action of the initial activity action for a level 0 of a compatibility level of a compatibility. This may be implemented as disclosed with reference to FIGS. 1-6.

With continued reference to FIG. 7, a method 700 includes a step 735 of generating, using at least a processor, an exposure action item as a function of an initial activity action. In some embodiments, the exposure action item may include a second activity recommendation. The method 700 may further include generating, using the at least a processor, the second activity recommendation of the exposure action item for a rejection action of an initial activity action. This may be implemented as disclosed with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
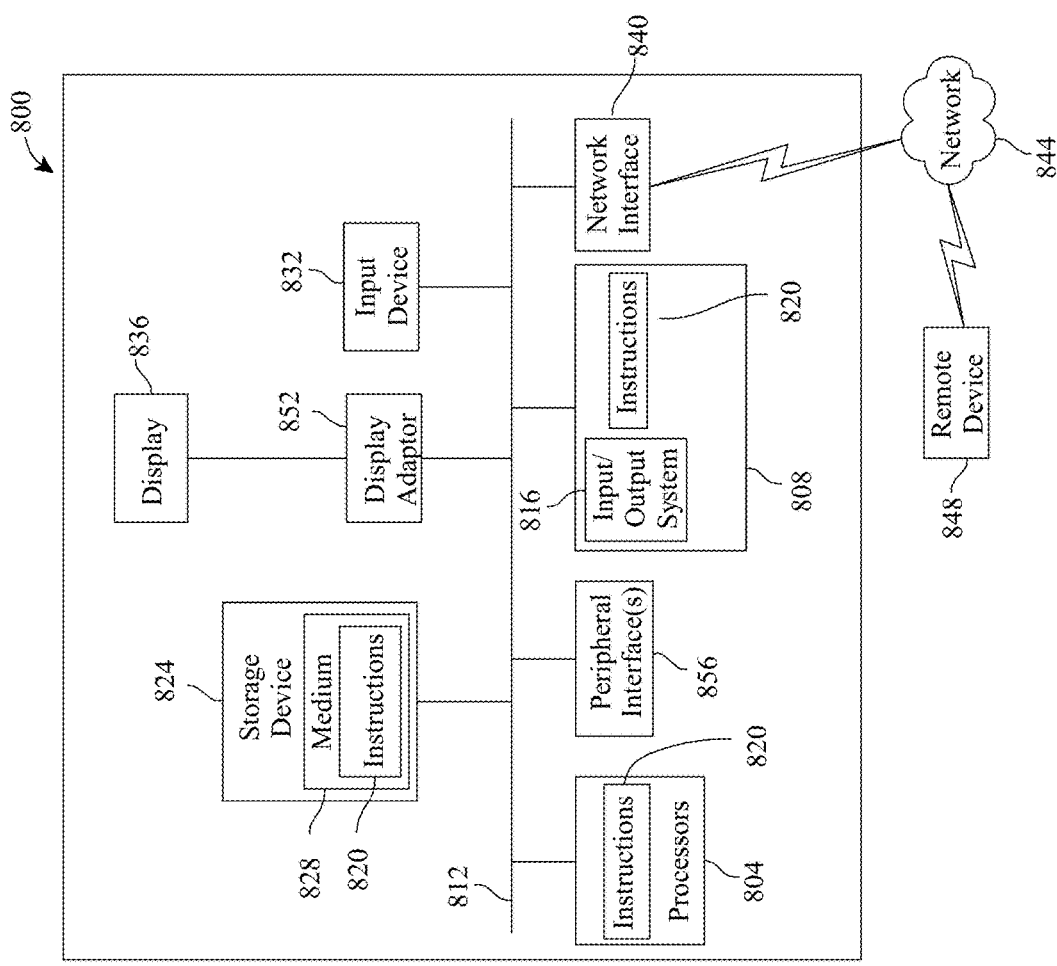
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a smart activity assignment for a user and a creator, wherein the apparatus comprises:
    at least one processor; and
    a memory communicatively connected to the at least one processor, wherein the memory contains instructions configuring the at least one processor to:
    receive user data from an immutable sequential listing, wherein the user data comprises user reputation data and initial activity data, wherein the initial activity data comprises a non-fungible token and an initial proposal;
    receive an initial activity of a creator from an activity database, wherein the initial activity comprises a proposal amount preference and a proposal amount threshold;
    transcribe the user reputation data using an optical character recognition, wherein transcribing the user reputation data comprises:
        recognizing a plurality of glyphs within the user reputation data using an intelligent character recognition machine learning process; and
        decomposing each glyph from the plurality of glyphs into at least a feature;
    identify positive user reputation and negative user reputation as a function of the user reputation data;
    classify the user data into one or more user data groups, wherein the one or more user data groups comprises a user reputation group and an initial activity group, wherein classifying the user data comprises classifying the user data into at least an initial proposal group;
    determine a user reputation score as a function of the user reputation group of the one or more user data groups, wherein determining the user reputation score comprises:
        training a user score machine learning model using user score training data, wherein the user score training data comprises correlations of initial proposal groups to user reputation scores; and
        outputting the user reputation score as a function of the user score machine learning model;
    compare the initial proposal to the proposal amount threshold;
    modify the user reputation score as a function of the comparison;
    generate activity score training data, wherein the activity score training data comprises correlations of initial activity information groups to initial activity scores;
    train an activity score machine learning model using the activity score training data;
    determine an initial activity score as a function of the initial activity group of the one or more user data groups as a function of the activity score machine learning model;
    analyze a compatibility of a user and the initial activity of the creator by comparing the user reputation score and the initial activity score, wherein analyzing the compatibility further comprises comparing the initial proposal to the proposal amount preference;
    generate an initial activity action as a function of the compatibility of the user and the initial activity of the creator; and
    generate an exposure action item as a function of the initial activity action.

2. The apparatus of claim 1, wherein:
    the user reputation data of the user data comprises the positive user reputation; and
    the user reputation group of the one or more user data groups comprises a positive user reputation group, wherein the positive user reputation group comprises the positive user reputation of the user reputation data of the user data.

3. The apparatus of claim 2, wherein the memory includes instructions further configuring the at least one processor to increase the user reputation score when the positive user reputation of the user reputation data in the positive user reputation group of the user reputation group of the one or more user data groups increases.

4. The apparatus of claim 1, wherein:
the user reputation data of the user data comprises the negative user reputation; and
the user reputation group of the one or more user data groups comprises a negative user reputation group, wherein the negative user reputation group comprises the negative user reputation of the user reputation data of the user data.

5. The apparatus of claim 4, wherein the memory includes instructions further configuring the at least one processor to decrease the user reputation score when the negative user reputation of the user reputation data in the negative user reputation group of the user reputation group of the one or more user data groups increases.

6. The apparatus of claim 1, wherein the initial activity data further comprises critical user data, wherein the critical user data comprises a name of a critical user.

7. The apparatus of claim 6, wherein:
the initial activity action comprises an approval action; and
the memory contains the instructions further comprising the at least one processor to determine the approval action of the initial activity action as a function of the critical user data.

8. The apparatus of claim 1, wherein the compatibility comprises a compatibility level, wherein the compatibility level comprises a level 0.

9. The apparatus of claim 8, wherein:
the initial activity action comprises a rejection action, wherein the rejection action is configured to reject the user; and
the memory includes instructions further configuring the at least one processor to generate the rejection action of the initial activity action for the level 0 of the compatibility level of the compatibility.

10. The apparatus of claim 9, wherein:
the exposure action item comprises a second activity recommendation; and
the memory contains the instructions further comprising the at least one processor to generate the second activity recommendation of the exposure action item for the rejection action of the initial activity action.

11. A method for distributing activities to a user and a creator, wherein the method comprises:
receiving, using at least one processor, user data from an immutable sequential listing, wherein the user data comprises user reputation data and initial activity data, wherein the initial activity data comprises a non-fungible token and an initial proposal;
receiving, using the at least one processor, an initial activity of a creator from an activity database, wherein the initial activity comprises a proposal amount preference and a proposal amount threshold;
transcribing, using the at least one processor, the user reputation data using an optical character recognition, wherein transcribing the user reputation data comprises:
recognizing a plurality of glyphs within the user reputation data using an intelligent character recognition machine learning process; and
decomposing each glyph from the plurality of glyphs into at least a feature;
identifying, using the at least one processor, positive user reputation and negative user reputation as a function of the user reputation data;
classifying, using the at least one processor, the user data into one or more user data groups, wherein the one or more user data groups comprises a user reputation group and an initial activity group, wherein classifying the user data comprises classifying the user data into at least an initial proposal group;
determining, using the at least one processor, a user reputation score as a function of the user reputation group of the one or more user data groups, wherein determining the user reputation score comprises:
training a user score machine learning model using user score training data, wherein the user score training data comprises correlations of initial proposal groups to user reputation scores; and
outputting the user reputation score as a function of the user score machine learning model;
comparing, using the at least one processor, the initial proposal to the proposal amount threshold;
modifying, by the at least one processor, the user reputation score as a function of the comparison;
generating, using the at least one processor, activity score training data, wherein the activity score training data comprises correlations of initial activity information groups to initial activity scores;
training, using the at least one processor, an activity score machine learning model using the activity score training data;
determining, using the at least one processor, an initial activity score as a function of the initial activity group of the one or more user data groups as a function of the activity score machine learning model;
analyzing, using the at least one processor, a compatibility of a user and the initial activity of the creator by comparing the user reputation score and the initial activity score, wherein analyzing the compatibility further comprises comparing the initial proposal to the proposal amount preference;
generating, using the at least one processor, an initial activity action as a function of the compatibility of the user and the initial activity of the creator; and
generating, using the at least one processor, an exposure action item as a function of the initial activity action.

12. The method of claim 11, wherein:
the user reputation data of the user data comprises the positive user reputation; and
the user reputation group of the one or more user data groups comprises a positive user reputation group, wherein the positive user reputation group comprises the positive user reputation of the user reputation data of the user data.

13. The method of claim 12, further comprising:
increasing, using the at least one processor, the user reputation score when the positive user reputation of the user reputation data in the positive user reputation group of the user reputation group of the one or more user data groups increases.

14. The method of claim 11, wherein:
the user reputation data of the user data comprises the negative user reputation; and
the user reputation group of the one or more user data groups comprises a negative user reputation group, wherein the negative user reputation group comprises the negative user reputation of the user reputation data of the user data.

15. The method of claim 14, further comprising:
decreasing, using the at least one processor, the user reputation score when the negative user reputation of the user reputation data in the negative user reputation group of the user reputation group of the one or more user data groups increases.

16. The method of claim 11, wherein the initial activity data further comprises critical user data, wherein the critical user data comprises a name of a critical user.

17. The method of claim 16, wherein the initial activity action comprises an approval action and further comprising:
   determining, using the at least one processor, the approval action of the initial activity action as a function of the critical user data.

18. The method of claim 11, wherein the compatibility comprises a compatibility level, wherein the compatibility level comprises a level 0.

19. The method of claim 18, wherein the initial activity action comprises a rejection action, wherein the rejection action is configured to reject the user and further comprising:
   generating, using the at least one processor, the rejection action of the initial activity action for the level 0 of the compatibility level of the compatibility.

20. The method of claim 19, wherein the exposure action item comprises a second activity recommendation and further comprising:
   generating, using the at least one processor, the second activity recommendation of the exposure action item for the rejection action of the initial activity action.

* * * * *